(12) United States Patent
Yamamoto

(10) Patent No.: US 6,236,802 B1
(45) Date of Patent: May 22, 2001

(54) EDITING APPARATUS AND EDITING METHOD

(75) Inventor: Tomoyuki Yamamoto, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/030,114

(22) Filed: Feb. 25, 1998

(30) Foreign Application Priority Data

Mar. 5, 1997 (JP) .................................................. 9-049965

(51) Int. Cl.$^7$ .................................................. G11B 27/00
(52) U.S. Cl. .................................................. 386/52; 386/55
(58) Field of Search .................................................. 386/46, 52, 55, 386/65, 112, 121; 345/328; H04N 5/76

(56) References Cited

U.S. PATENT DOCUMENTS

| | | | |
|---|---|---|---|
| 4,774,600 | * | 9/1988 | Baumeister .......................... 386/55 |
| 5,206,929 | * | 4/1993 | Langford et al. .......................... 386/55 |
| 5,459,582 | * | 10/1995 | Takahashi .......................... 386/112 |
| 5,760,767 | * | 6/1998 | Shore et al. .......................... 345/328 |
| 5,825,967 | * | 10/1998 | Steward et al. .......................... 386/55 |
| 5,930,446 | * | 7/1999 | Kanda .......................... 386/52 |

* cited by examiner

*Primary Examiner*—Huy Nguyen
(74) *Attorney, Agent, or Firm*—Lerner, David, Littenberg, Krumholz & Mentlik, LLP

(57) ABSTRACT

An editing apparatus or method, when applied in particular to a simple editing system using an information processing apparatus, such as a personal computer, makes possible execution of various aspects of editing in a simple configuration. Only partial video signals required for the setting of editing points are transferred to working memory means to enable the result of editing to be previewed.

17 Claims, 23 Drawing Sheets

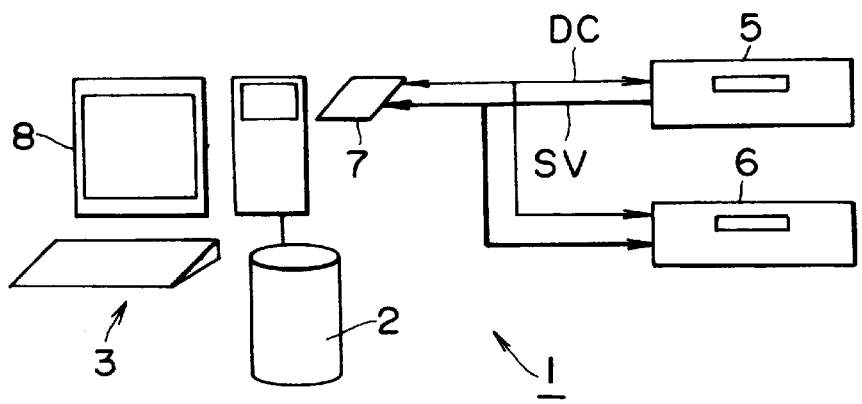
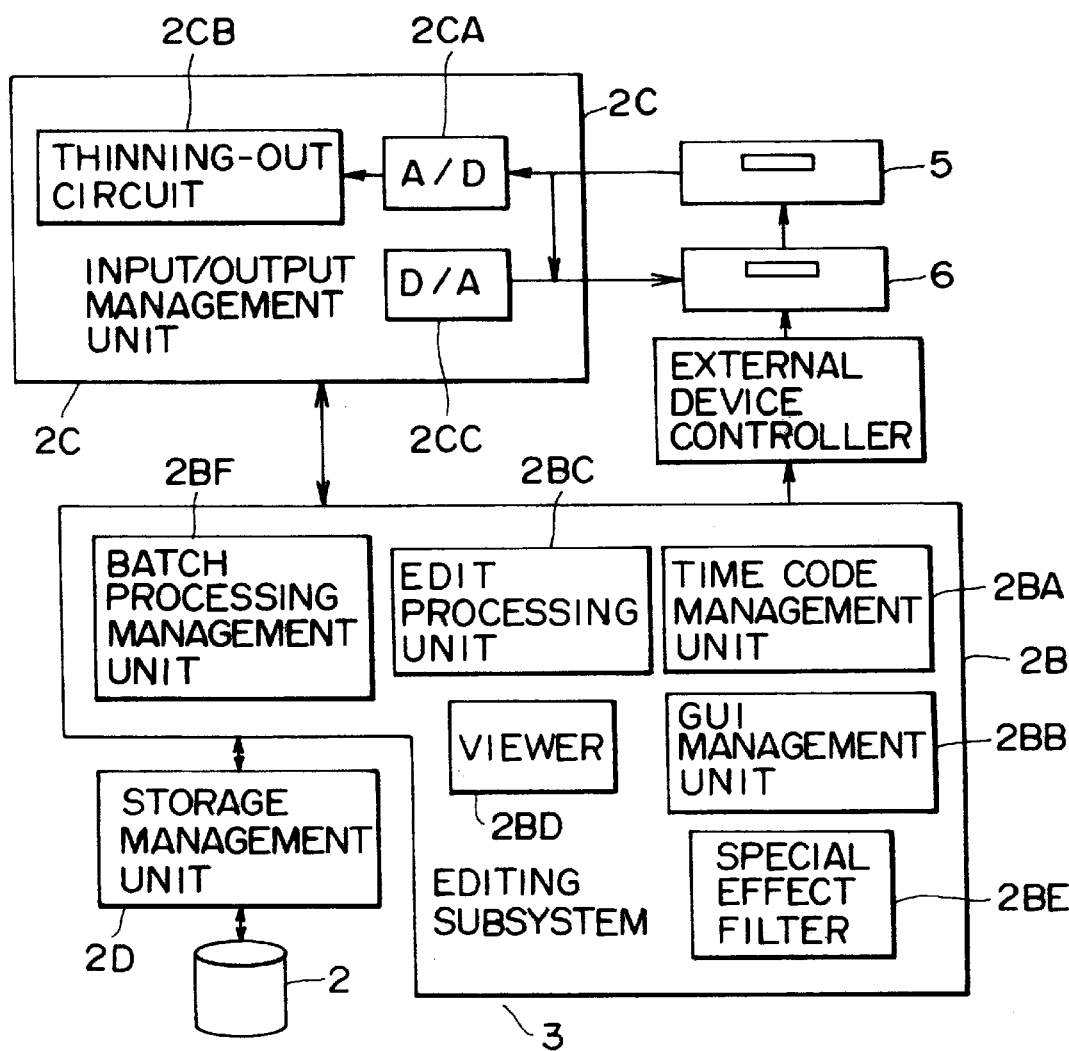

F I G. 15

| [SCENE ID] | [REFERENCE TB] | [SOURCE ETC] | [EFFECTTYPE] |
|---|---|---|---|
| 00011 | 00+00+00:00:00:00 | 01+01+00:02:03:15 | |
| 00010 | 00+00+00:05:04:03 | 01+01+00:07:07:18 | |
| 000211 | 00+00+00:05:04:04 | 01+01+00:07:07:19 | v-WipeA |
| 000212 | 00+00+00:05:04:04 | 02+03+00:54:11:28 | v-WipeB |
| 000201 | 00+00+00:05:09:04 | 01+01+00:07:12:19 | |
| 000202 | 00+00+00:05:09:04 | 02+03+00:54:19:28 | |
| 00031 | 00+00+00:05:09:05 | 02+03+00:54:11:29 | |
| 00030 | 00+00+00:11:18:22 | 02+03+01:00:21:16 | |
| 000411 | 00+00+00:11:18:23 | 01+02+00:18:25:08 | disolve A |
| 000412 | 00+00+00:11:18:23 | 01+02+01:25:14:22 | disolve B |
| 000401 | 00+00+00:11:21:23 | 01+02+00:21:25:08 | |
| 000402 | 00+00+00:11:21:23 | 01+02+01:28:14:22 | |
| 00051 | 00+00+00:11:21:24 | 01+02+01:28:14:23 | |
| 00050 | 00+00+00:18:29:20 | 01+02+01:35:22:19 | |

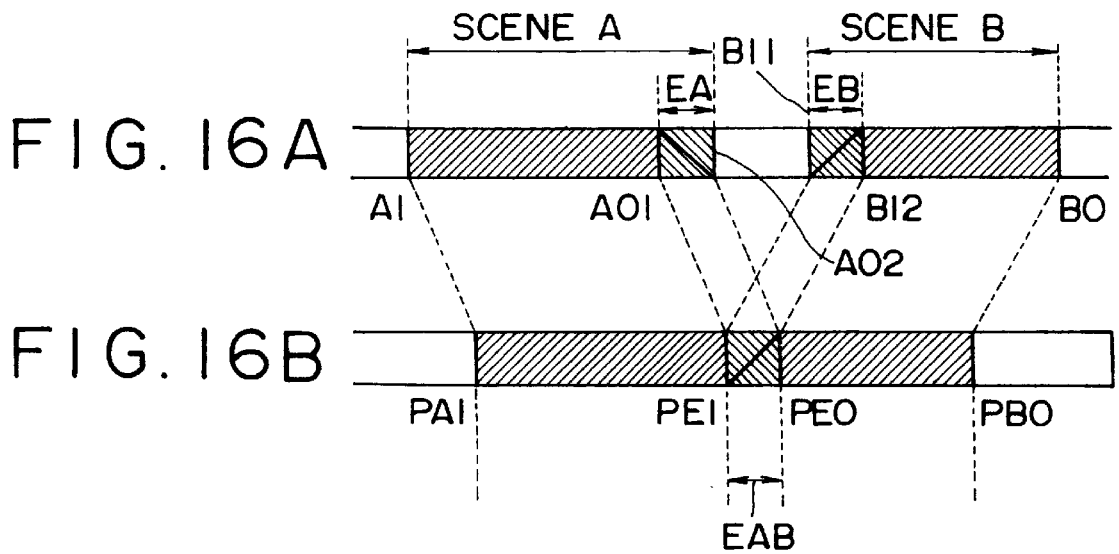
FIG. 16A
FIG. 16B
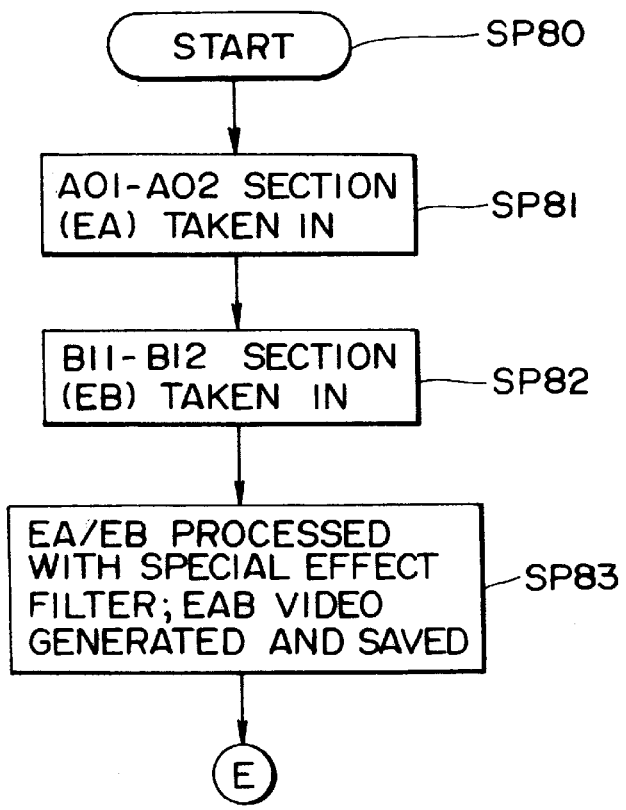
FIG. 17

FIG. 23A, FIG. 23B1, FIG. 23B2, FIG. 23C1, FIG. 23C2, FIG. 23D1, FIG. 23D2

EDITING APPARATUS AND EDITING METHOD

BACKGROUND OF THE INVENTION

1. Field of the Invention

The present invention relates to an editing apparatus and an editing method, and more particularly to an editing apparatus and an editing method suitable for use in an editing system employing an information processing apparatus having memory means of a relatively small capacity, such as a personal computer.

2. Description of the Prior Art

Editing apparatuses conventionally used in broadcasting stations and elsewhere record in a large capacity hard disk unit video signals to be edited, and then edit these recorded signals.

Thus, an editing apparatus for application to such equipment has a large-capacity hard disk unit, into which original video materials recorded on a plurality of magnetic tapes are recorded (copied). This editing apparatus is configured to prepare an editing list on the basis of the video materials recorded on this hard disk unit, edit according to this editing list the video materials recorded on the hard disk unit, and record the result of edition in a video tape recorder or the like.

Incidentally, in recent years, it has come to be desired to use an information processing apparatus, such as a personal computer, to easily accomplish this kind of editing tasks. In this case, it is conceivable to re-record the original video materials into the personal computer for editing as in the case of a conventional editing apparatus.

However, this would entail the need for a hard disk unit of an extremely large capacity on the part of the personal computer, which would prevent an editing system of this kind to be easily structured.

One proposed solution to this problem is a method whereby a version of video materials is prepared for use in the compilation of the editing list on the part of the personal computer by reducing the resolution of the original video materials. Thus, the operator would compile an editing list on the personal computer from the video materials whose data quantity has been reduced in this manner, and edit the original video materials according to the editing list thereby compiled. However, though this would make it possible to reduce the quantity of data to be recorded on the part of the personal computer, there still remains the problem that eventually a hard disk unit having a large enough capacity to store all the video materials would be required.

SUMMARY OF THE INVENTION

The present invention has been attempted in view of the aforementioned problems, and is intended to propose an editing apparatus and an editing method which permit execution of various aspects of editing work in a simple configuration.

According to the invention, there is provided an editing apparatus comprising:

a playback controller for effecting control to selectively enter video signals, which are to be edited, as instructed by an operator from a playback side memory apparatus in which the video signals are recorded;

memory means for recording said selectively entered video signals;

a list generator for generating an editing list on the basis of the video signals recorded in said memory means and editing commands given by the operator regarding said video signals; and an edit processor for controlling, on the basis of said editing list, the playback side memory apparatus to edit said video signals to be edited.

According to the invention, there is also provided an editing method whereby:

video signals, which are to be edited, are selectively entered as instructed by the operator from the playback side memory apparatus in which the video signals are recorded;

said selectively entered video signals are recorded;

an editing list is generated on the basis of the video signals recorded in said memory means and editing commands given by the operator regarding said video signals; and the playback memory apparatus is controlled to edit said video signals to be edited on the basis of said editing list.

BRIEF DESCRIPTION OF THE DRAWINGS

FIG. 1 is a schematic diagram of the overall configuration of an editing apparatus.

FIG. 2 is a block diagram of the editing apparatus shown in FIG. 1.

FIG. 15 is a chart showing an editing list.

FIGS. 16A and 16B are schematic diagrams for use in describing the processing of special effects.

FIG. 17 is a flow chart showing the sequence of processing of a special effect.

FIGS. 23A to 23D2 are schematic diagrams for use in describing batch processing.

DETAILED DESCRIPTION OF THE PREFERRED EMBODIMENT

Figure 3:
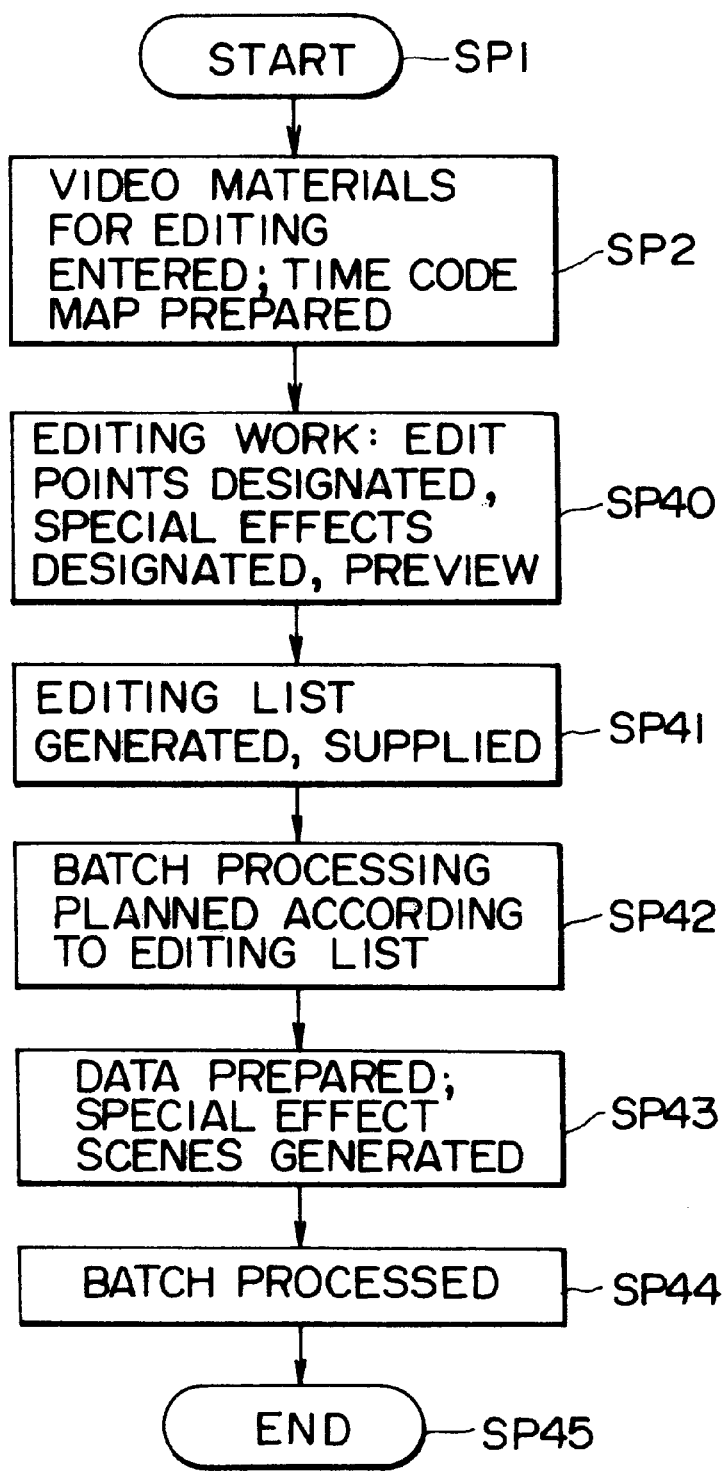
FIG. 3 is a flowchart showing the overall processing sequence in the editing apparatus shown in FIG. 1.

A preferred embodiment of the present invention will be described in detail below with reference to drawings as appropriate.

FIG. 1 is a schematic diagram of the overall configuration of an editing apparatus, which is a preferred embodiment of the invention. This editing apparatus 1 is composed by connecting a playback side video cassette recorder (VCR) 5 and a recording side VCR 6 to a personal computer 3 in whose hard disk unit 2 is stored an editing program.

The personal computer 3 here is equipped with a video capture board 7 in a prescribed extension slot, and connected to the playback side VCR 5 and the recording side VCR 6 via this video capture board 7. This arrangement enables the personal computer 3, when an operator executes a prescribed operation in accordance with a graphical user interface (GUI) displayed on a display unit 8, issues a control command DC to the playback side VCR 5 and the recording side VCR 6, and controls the actions of these VCRs 5 and 6 with the control command DC. The personal computer 3 effects control so as to take in and process video signals SV played back by the playback side VCR 5 and, as required, to have the processed video signals recorded into the recording side VCR 6.

The editing apparatus 1 prepares an editing list by controlling peripheral units to have the personal computer 3 execute a sequence of processings, and records the result of editing into the recording side VCR 6 according to the editing list which has been prepared.

FIG. 2 is a block diagram illustrating functional blocks of the personal computer 3. An external device controller 2A controls the actions of the playback side VCR 5 and the recording side VCR 6, which consist of external units in this case, under the control of an editing subsystem 2B, thereby switches the actions of these VCRs 5 and 6, and achieves actions including cueing, recording, playback and synchronization.

An input/output management unit 2C manages, under the control of the editing subsystem 2B, the inputting/outputting of video signals and audio signals between the playback side VCR 5 and the recording side VCR 6. In this inputting/outputting operation, the input/output management unit 2c generates digital video signals by subjecting successively entered video signals to analog-to-digital (A/D) conversion by an A/D converter 2CA arranged on the video capture board 7, and supplies these digital video signals to the editing subsystem 2B.

At this time the input/output management unit 2C, at the instruction of the editing subsystem 2B, thins out digital video signals with a thinning-out circuit 2CB arranged on the video capture board 7, downgrades the resolution of these digital video signals and thereby reduces the data quantity of the digital video signals.

The input/output management unit 2C also receives digital video signals supplied by the editing subsystem 2B, converts them into video signals with a digital-to-analog (D/A) converter 2CC arranged on the video capture board 7, and outputs the converted signals. In this operation to input/output video signals, the input/output management unit 2C extracts time codes added to the video signals, and supplies them to the editing subsystem 2B. The input/output management unit 2C also adds time codes supplied to the recording side VCR 6 by the editing subsystem 2B to the video signals it outputs.

A storage management unit 2D controls, under the control of the editing subsystem 2B, the action of the hard disk unit 2, controls video signals and audio signals entered from the input/output management unit 2C so as to record them into the hard disk unit 2, and also effects control so as to reproduce and supply these video signals and audio signals recorded in the hard disk unit 2.

The editing subsystem 2B consists of main modules required for edit processing. Of these modules, a time code management unit 2BA manages time codes for objects of editing and results of editing. In this management, the time code management unit prepares extended time codes and a time code map needed for the preparation of an editing list, and manages the editing list on the basis of these extended time codes and time code map. The extended time codes here are time codes unique to this editing system to specify video signals, which are the objects of editing, as well as a video cassette in which the objects of editing are recorded.

A GUI management unit 2BB manages the graphical user interface displayed on the display unit 8, switches the display on the display unit under the control of an edit processing unit 2BC, and notifies the edit processing unit 2BC of the operator's manipulation on this display screen.

A viewer 2BD issues, under the control of the edit processing unit 2BC, a request to the storage management unit 2D, and display video signals stored in the hard disk unit 2 in a prescribed window formed on the display unit 8. Audio signals are supplied to a prescribed unit of playback hardware. The editing apparatus 1 is thereby enabled to check the preview picture of the video signals stored in the hard disk unit 2.

Special effect filters 2BE are provided in a plurality of types corresponding to special effects to be added by this editing apparatus 1, and add various effects to video signals under the control of the edit processing unit 2BC as designated by the operator. With these special effect filters 2BE, processings including wipes and dissolves can be executed.

The edit processing unit 2BC controls various modules according to notifications from the GUI management unit 2BB, and thereby executes the preparation of the editing list and other tasks in this editing apparatus 1.

A batch processing management unit 2BF executes, under the control of the edit processing unit 2BC, the schedule management of batch processing for the editing of video signals in accordance with the editing list, and manages the external device controller 2A according to this schedule management. The batch processing management unit 2BF is thereby enabled to edit video signals recorded on a plurality of magnetic tapes and record the edited signals into the recording side VCR without requiring frequent VCR loading into and unloading from the playback side VCR 5.

FIG. 3 is a flow chart showing the procedure of processing by the edit processing unit 2BC in the sequence of editing work.

First, the edit processing unit 2BC, as the operator actuates power supply to the editing apparatus 1 and selects a prescribed menu on the display unit 8, starts this procedure of processing, and moves from step SP1 to step SP2. Here the edit processing unit 2BC controls the GUI management unit 2BB to display the prescribed menu frame on the display unit 8. The edit processing unit 2BC further accepts a rough setting of in-points and out-points by the operator in response to the actions indicated on this menu frame, and enters video materials for the editing work from the playback side VCR 5 into the editing apparatus 1 on the basis of these roughly set in-points and out-points.

This input processing of video materials for the editing work will now be described with reference to FIGS. 4 to 8.

Figure 4:
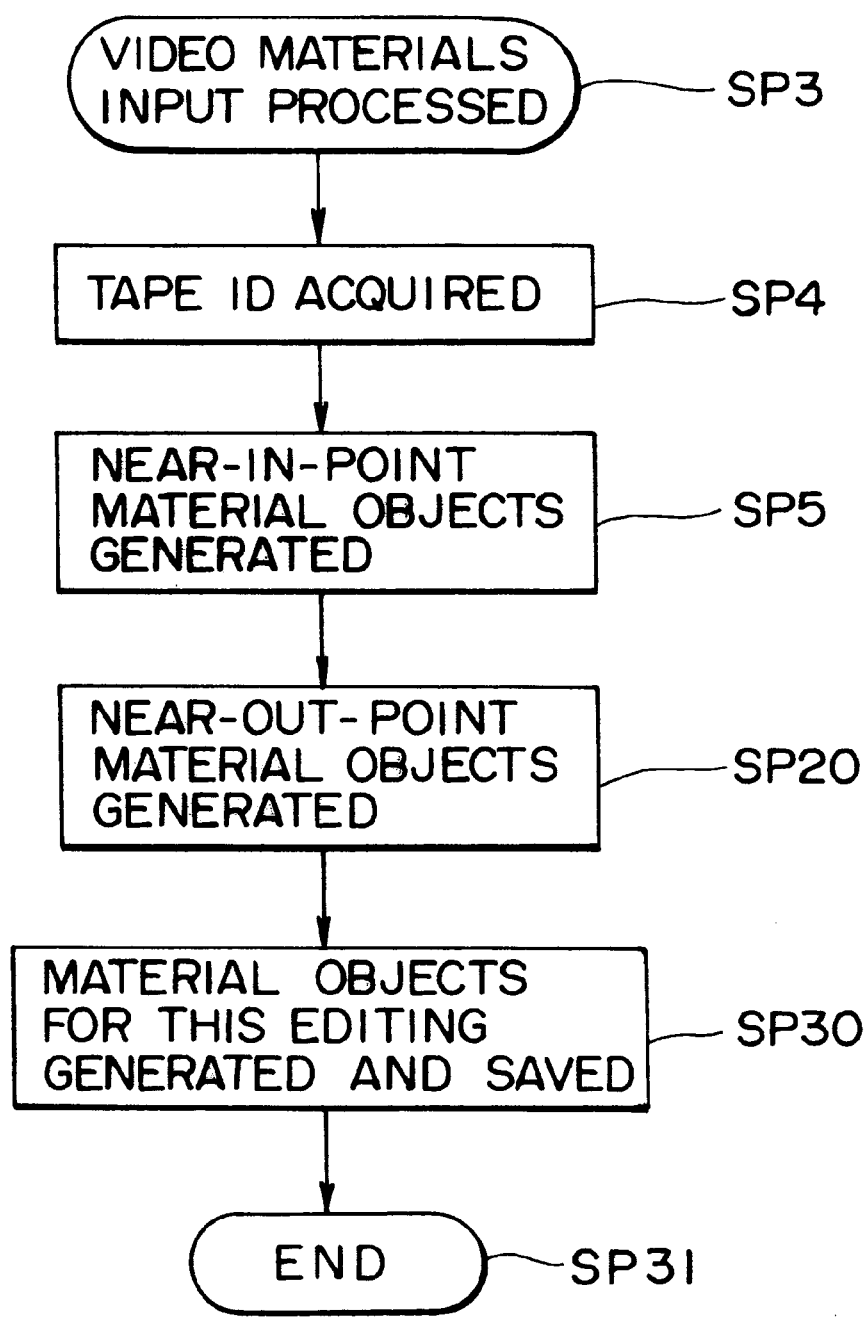
FIG. 4 is a flow chart for use in describing the entry of video materials into an editing apparatus, which is a preferred embodiment of the present invention.

The edit processing unit 2BC, as shown in FIG. 4, moves on from step SP3 to step SP4 in the input processing of these video materials, and acquires a tape ID. The tape ID here is an identification code for the tape on which the video materials are recorded, and the edit processing unit 2BC acquires the tape ID on the basis of management data recorded on the initial part of each magnetic tape. If a tape ID fails to be acquired on the basis of the management data, the edit processing unit 2BC controls the GUI management unit 2BB to urge the operator to enter a tape ID, and thereby acquires the tape ID.

Figure 5:
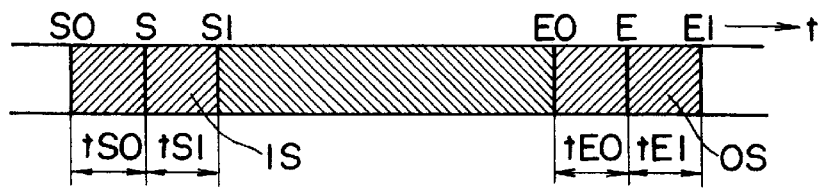
FIG. 5 is a schematic diagram for use in describing the entry of video materials.

Then the edit processing unit 2BC moves on to step SP5, and generates near-in-point material objects. Here in this particular embodiment of the invention, the editing apparatus 1, as illustrated in FIG. 5, takes in video signals IS and OS around the rough in-points S and out-points E, set by the operator, for a prescribed period with respect to editing materials between the in-points S and the out-points E and, using the materials taken in, executes processings including previewing.

Figure 6:
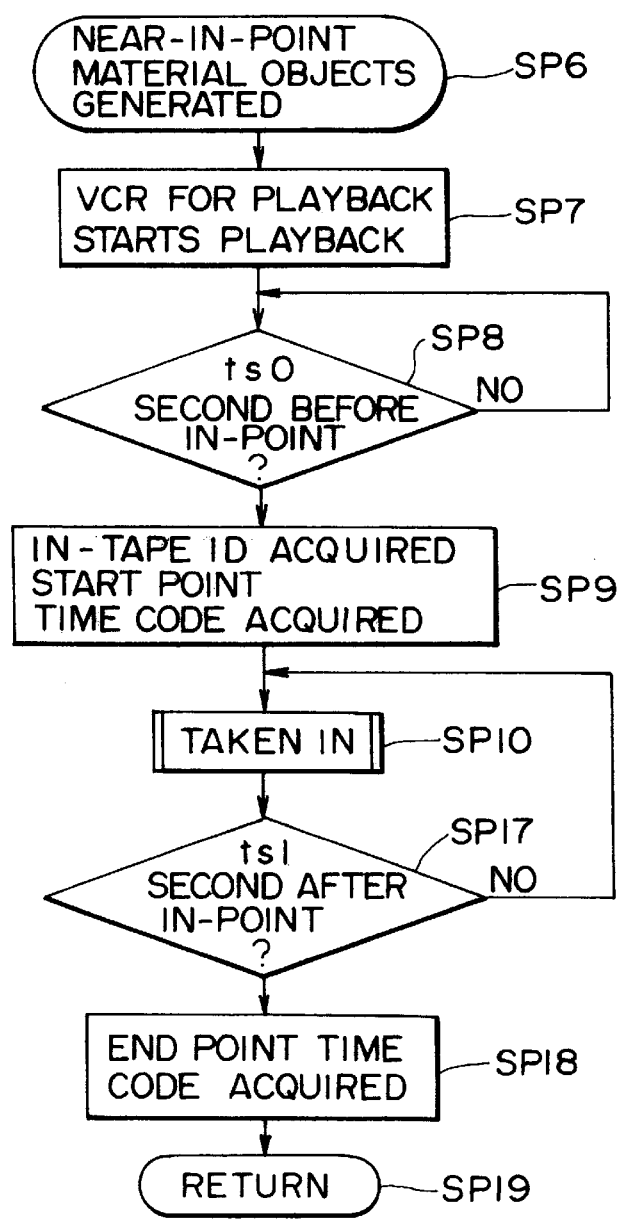
FIG. 6 is a flow chart for use in describing the entry of video materials near in-points.

Of these objects, near-in-point material objects IS are video signals for a prescribed period around an in-point S, and the edit processing unit 2BC, executing the processing procedure shown in FIG. 6, enters these near-in-point material objects IS. Thus the edit processing unit 2BC moves on from step SP6 to step SP7, where it instructs via the external device controller 2A the playback side VCR 5 to play back.

At this time, the edit processing unit 2BC, after rewinding the magnetic tape to a position before the operator-set in-point S by a prescribed period, causes the playback side VCR 5 to play back and, at the next step SP8, judges whether or not the playback position of the playback side VCR 5 has reached a position before the in-point by the prescribed period tS0 on the basis of a time code obtained via the time code management unit 2BA.

If a negative result is obtained here, the edit processing unit 2BC will repeat step SP8 and, when the playback position of the playback side VCR 5 reaches the position before the in-point by the prescribed period tS0, will move on to step SP9 because an affirmative result is obtained at step SP8. Here the edit processing unit 2BC acquires an in-tape ID, and also acquires the start point time code S0 (FIG. 5) of the near-in-point material objects.

Here the in-tape ID is an ID code for identifying a video material within the tape. In this embodiment of the invention, consecutive numbers are set within each tape as in-tape IDs, each number representing a pair of an in-point and an out-point set by the operator, in the sequence of the playback of video materials.

Then the edit processing unit 2BC goes on to step SP10, and controls the input/output management unit 2C to take in a one-frame equivalent of video signals played back by the playback side VCR 5.

Figure 7:
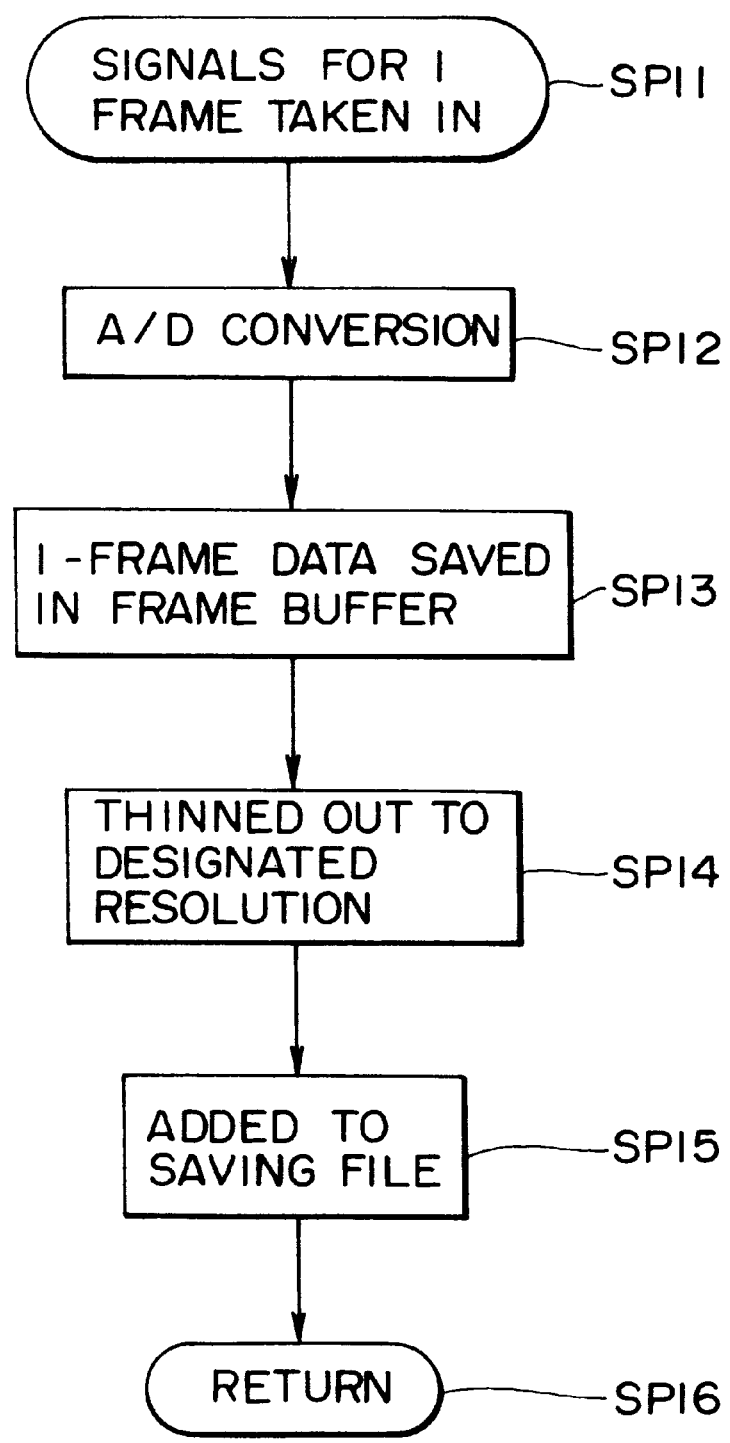
FIG. 7 is a flow chart for use in describing the entry of video materials near in-points for one frame.

The taking-in of video signals will be described here in detail with reference to FIG. 7. The edit processing unit 2BC, moving on from step SP11 to step SP12, actuates the A/D converter 2CA, so that video signals which are successively entered can be converted into digital video signals. Then the edit processing unit 2BC goes on to step SP13, and stores a one-frame equivalent of digital video signals into a frame buffer arranged downstream from the A/D converter 2CA.

Then the edit processing unit 2BC, moving on to step SP14, actuates the thinning-out circuit 2CB, and reduces the resolution of the digital video signals stored in the frame buffer. At the next step SP15, the edit processing circuit 2BC, after recording into the hard disk unit 2 these resolution-reduced digital video signals in addition to an existing file for editing work, goes on to step SP16 to complete the processing procedure.

Having taken in a one-frame equivalent of video signals in this manner, the edit processing unit 2BC moves on to step SP17 (FIG. 6), and judges whether or not the playback position of the playback side VCR 5 is in a position after the in-point S by a prescribed period tS1. If a negative result is obtained here, the edit processing unit 2BC will return to step SP10, and take in a one-frame equivalent of ensuing video signals. Repeating this processing procedure of going back and forth between steps SP10 and SP17, the edit processing unit 2BC forms one file consisting of video signals from a position S0, back from the operator-set in-point S by a time length of tS0, till a position S1 after the in-point S by a time length of tS1, and holds this file as near-in-point material objects IM in the hard disk unit 2.

Having obtained an affirmative result at step SP17, the edit processing unit 2BC moves on to step SP18 where it acquires a time code S1 for the end point (FIG. 5) with respect to these near-in-point material objects, and goes on to step SP19 to return to the main routine.

Having taken in the near-in-point material objects IM in this manner, the edit processing unit 2BC moves on to step SP20 (FIG. 4), where it takes in near-out-point material objects OM.

Figure 8:
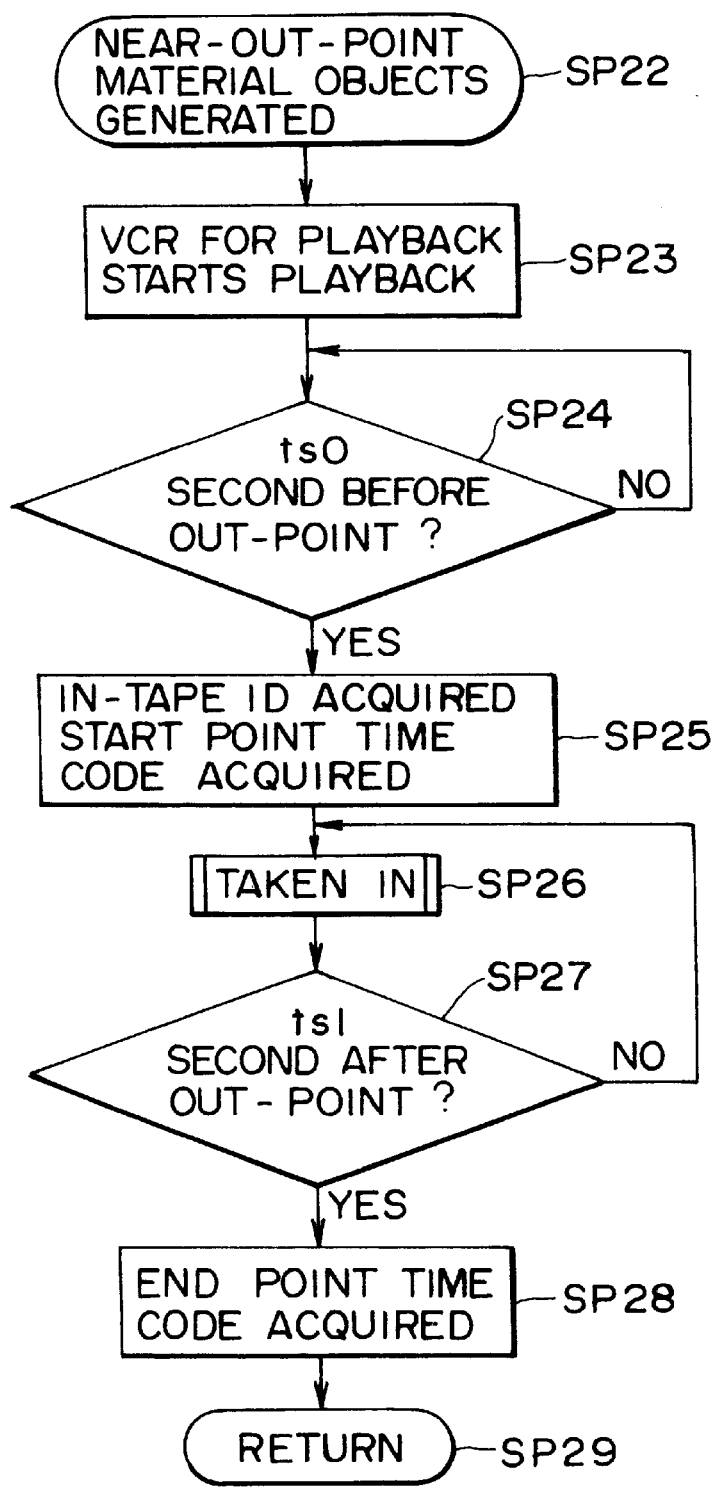
FIG. 8 is a flow chart for use in describing the entry of video materials near out-points.

The processing to generate these near-out-point material objects will now be described in detail with reference to FIG. 8. The edit processing unit 2BC, going on from step SP22 to step SP23, instructs the playback side VCR 5 to play back the video tape. At this time, the edit processing circuit 2BC, after fast-forwarding the magnetic tape to a position back from an out-point E (FIG. 5) set by the operator by a prescribed period, causes the playback side VCR 5 to play back the tape and, at the following step SP24, judges whether or not the playback position of the playback side VCR 5 has reached a position before the out-point by the prescribed period tE0 on the basis of a time code obtained via the time code management unit 2BA.

If a negative result is obtained here, the edit processing unit 2BC will repeat step SP24 and, when the playback position of the playback side VCR 5 reaches the position before the out-point by a prescribed period tE0, will move on to step SP25 because an affirmative result is obtained at step SP24. Here the edit processing unit 2BC acquires an in-tape ID, and also acquires the start point time code E0 (FIG. 5) of the near-out-point material objects. Here, it is so disposed that the in-tape ID at the out-point coincide with the in-tape ID obtained at the in-point.

Then the edit processing unit 2BC, moving on to step SP26, controls the input/output management unit 2, takes in a one-frame equivalent of video signals played back by the playback side VCR 5. The taking-in of video signals here is executed in the same processing procedure as that of near-in-point material objects described with reference to FIG. 7.

Having taken in a one-frame equivalent of video signals in this manner, the edit processing unit 2BC moves on to step SP27, and judges whether or not the playback position of the playback side VCR 5 is in a position after the out-point E by a prescribed period tE1. If a negative result is obtained here, the edit processing unit 2BC will return to step SP 26, and take in a one-frame equivalent of ensuing video signals. Repeating this processing procedure of going back and forth between steps SP26 and SP27, the edit processing unit 2BC forms one file consisting of video signals from a position E0, back from the operator-set in-point E by a time length of tE0, till a position E1 after the in-point E by a time length of tE1, and holds this file as near-out-point material objects OM in the hard disk unit 2.

Having obtained an affirmative result at step SP27, the edit processing unit 2BC moves on to step SP28 where it acquires a time code 1 for the end point with respect to these near-out-point material objects, and goes on to step SP 29 to return to the main routine.

Having taken in the near-out-point material objects OM in this manner, the edit processing unit 2BC moves on to step SP30 (FIG. 4), where it adds the file name to the near-in-point material objects IM and the near-out-point material objects OM, stores them from the working area to another prescribed area in the hard disk unit 2, compiles an editing material object file covering these two kinds of objects together and, after storing it into the same prescribed area, goes on to step SP31 to complete this processing procedure.

The edit processing unit 2BC thus executes the processing procedure for each of the in-points and out-points set by the operator, and stores the video materials to be worked on into the hard disk unit 2. The edit processing unit 2, after completing the entry of a video material to be worked on for every operator-set in-point and out-point, prepares a time code map (SP2 in FIG. 3).

Figures 9A, 9B, 9C:
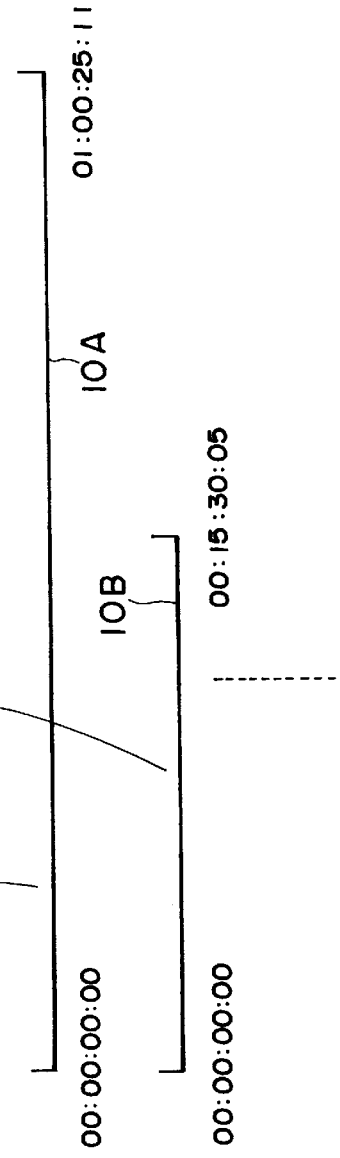
FIGS. 9A to 9C are charts illustrating a time code map.

Here, as illustrated in FIG. 9, the edit processing unit 2BC prepares the time code map out of the tape Ids, in-tape IDS, the time codes of the start and end points and extended time codes corresponding to the time codes of the start and end points with respect to the video materials taken into the hard disk unit 2. The start points and end points here correspond to the operator-set in-points and out-points, respectively. The extended time codes are prepared by adding the tape ID and the in-tape ID to the time code of each start point or end point.

For instance, if two video materials recorded on two magnetic tapes 10A and 10B are to be edited (FIGS. 9B and 9C), extended time codes are formed by adding the start and end points of the video materials recorded on the two magnetic tapes to the respective tape IDs and in-tape IDs of the magnetic tapes 10A and 10B, and the time code map is compiled out of these extended time codes. This time code map enables the editing apparatus 1 to relate the video materials to be played back by the playback side VCR 5 and the video materials recorded in the hard disk unit 2.

Having completed the compilation of the time code map in this manner, the edit processing unit 2BC executes editing work at step SP40. Here the edit processing unit 2BC, in response to operation by the operator, reads out the video material to be worked on which are recorded in the hard disk unit 2, repeats preview processing and accepts alteration of in-points and out-points by the operator. It also accepts designation of special effects according to manipulation by the operator.

Then the edit processing unit 2BC, moving on to step SP41 as instructed by the operator, updates the time code map in accordance with the in-points and the like altered in the course of preview processing, and prepares an editing list. Further the edit processing unit 2BC, at the following step SP42, controls the batch processing management unit 2BF to plan editing work by batch processing according to the editing list.

Then the edit processing unit 2BC, after preparing a special effect scene in the editing work at step SP43, records by batch processing at step SP44 video signals played back by the playback side VCR 5 into the recording side VCR 6. After recording video signals resulting from editing according to the editing list into the recording side VCR 6, the edit processing unit 2BC goes on to step SP45 to complete this processing procedure.

Figures 10A, 10B:
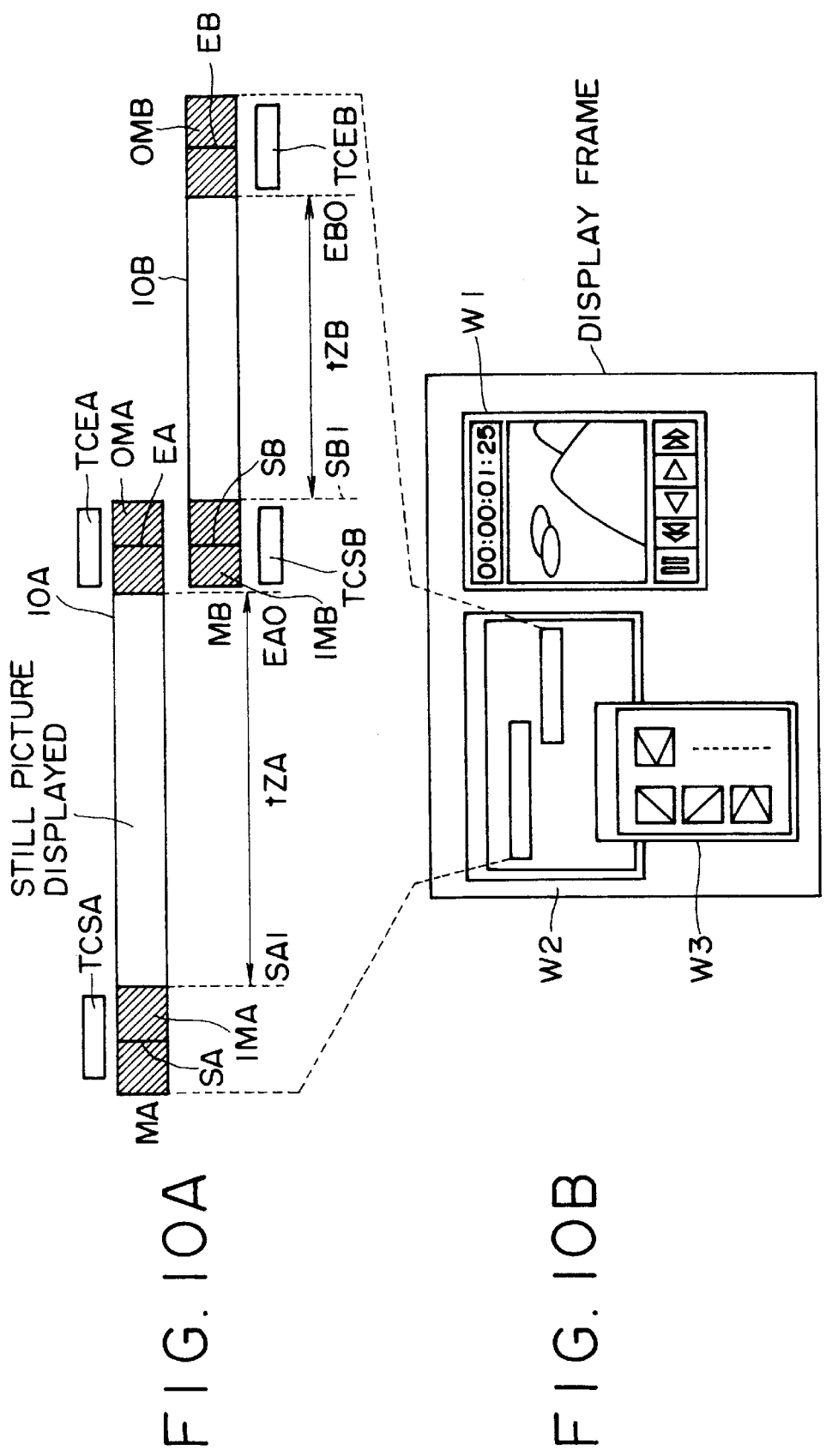
FIGS. 10A and 10B are schematic diagrams of a display frame in previewing.

FIG. 10 is a schematic diagram of a display frame on the display unit 8 during editing work. The edit processing unit 2BC, as the operator designates a video material to work on after selecting an editing mode, displays this frame (FIG. 10B). The display frame here consists of a plurality of windows, of which one window W1 displays video signals resulting from previewing. In the upper part of this preview result is shown a reference time code, and in the lower part of same are displayed icons denoting playback, fast forward, rewind and so forth. The editing apparatus 1 thereby makes it possible to check the result of editing by clicking one or another of these icons.

The edit processing unit 2BC also displays a window W2 to check the video material to be previewed, and the video material displayed in the window W1 is displayed in a bar shape together with the preceding and following video materials. In this window W2, as the bars therein are shown in an expanded form in FIG. 10A, the video materials 10A and 10B to be worked on are expressed in a bar shape, with the near-in-point material objects IMA and IMB and the corresponding near-out-point material objects OMA and OMB being positioned at the respective two ends. Further, the respective time codes TCSA, TCSB, TCEA and TCEB of the in-points and out-points of the near-in-point material objects IMA and IMB and the near-out-point material objects OMA and OMB are displayed close to the corresponding ones of the near-in-point material objects IMA and IMB and the near-out-point material objects OMA and OMB.

The in-points and out-points of the near-in-point material objects IMA and IMB and of the near-out-point material objects OMA and OMB are represented by linear cursors SA, SB, EA and EB, respectively, and in the edit processing unit 2BC, the in-points and out-points can be altered by clicking and dragging the corresponding cursors SA, SB, EA and EB with a mouse.

This display frame further is so formed that a third window W3 can be opened by selecting an appropriate menu, and a filter for a special effect to be worked on a video material in editing can be displayed in this third window. In the editing apparatus 1, various filtering effects can be accomplished at designated editing points by dragging icons, displayed in this third window W3, to a scene-transitional segment that can be composed of a near-out-point material object OMA and a near-in-point material object IMA. Incidentally in this embodiment of the invention, various wipes, dissolves and other special effects can be chosen by selecting an appropriate menu, and the filtering period and other factors can be set in respect of each individual menu.

Figure 11:
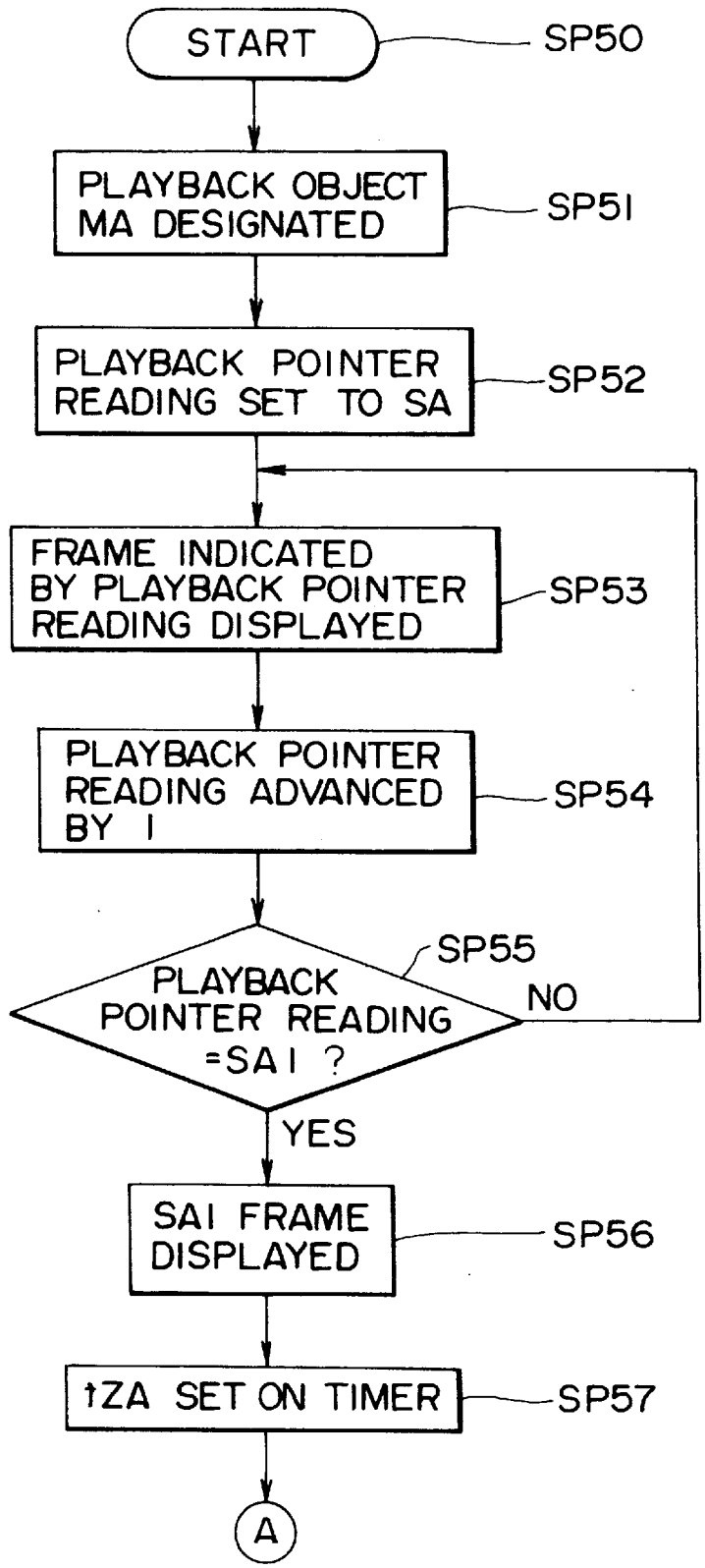
FIG. 11 is a flow chart showing the sequence of processing in previewing.

FIG. 11 is a flow chart showing the processing procedure of the edit processing unit in the case where the operator has chosen a preview menu for cut editing.

Thus the edit processing unit moves on from step SP50 to step SP51, and accepts the designation of a playback object MA (FIG. 10) consisting of a video material with which to start previewing. Then the edit processing unit 2BC goes on to step SP52, where it sets a playback pointer reading corresponding to the in-point of the playback object MA.

Next the edit processing unit 2BC moves on to step SP53, where it instructs a video material to be worked on (a frame) to be read out of the hard disk unit 2 on the basis of this playback pointer reading, and displays the played-back picture designated by this pointer in the window W1 of the display unit 8. Then the edit processing unit 2BC goes on to step SP54, where it advances the playback pointer reading by a value of 1, and further moves on to step SP55. Here the edit processing unit 2BC judges whether or not the frame indicated by this playback pointer reading corresponds to the time code SA1 at the end of the near-in-point material object IMA. If a negative result is obtained here, the edit processing unit 2BC will return to step SP53, and display in the window W1 the video signal corresponding to this playback pointer advanced by 1.

The edit processing unit 2BC starts playing back the near-in-point material object IMA, recorded in the hard disk unit 2, from the in-point, repeats the processing procedure in the sequence of SP53-SP54-SP55-SP53, and successively displays contents of this near-in-point material object IMA in the window W1. As it plays back in this state the near-in-point material object IMA to its end, it moves on from step SP55 to step SP56 because an affirmative result is obtained at step SP55, and the edit processing unit 2BC displays the end frame SA1 in the window W1.

Figure 12:
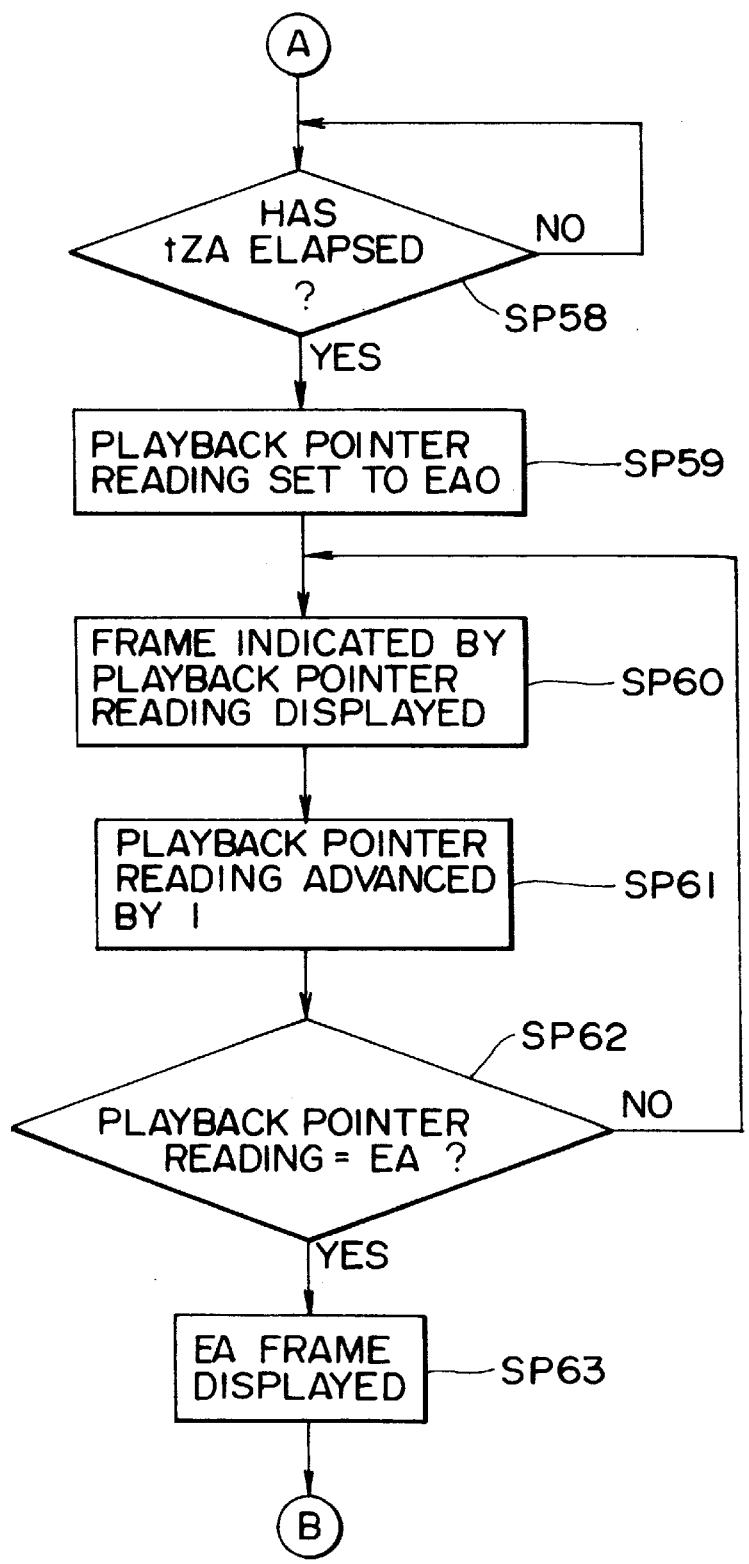
FIG. 12 is a flow chart showing the sequence of processing continuing from FIG. 11.

Then the edit processing unit 2BC moves on to step SP57, where it sets a prescribed length of time tZA in a built-in timer. This time length tZA here is the period from the end of the near-in-point material object IMA to the beginning of the corresponding near-out-point material object OMA. After setting the timer in this way, the edit processing unit 2BC, as shown in FIG. 12, goes on to step SP58, where the edit processing unit 2BC judges whether or not the time length tZA set in the timer has elapsed. If the result is negative, it will repeat step SP58.

The edit processing unit 2BC successively displays the contents of the near-in-point material object IMA beginning with the in-point SA. When it reaches the end of the near-in-point material object IMA, the edit processing unit 2BC fixes the display in the window W1 to the representation of this end, and awaits the lapse of the period tZA. Thus, when previewing the near-in-point material object IMA and the near-out-point material object OMA of the objects of editing taken into the hard disk unit 2, the editing apparatus 1 displays, with respect to video materials which are located between these near-in-point material object IMA and near-out-point material object OMA but not taken into the hard disk unit 2, the frame at the end of the near-in-point material object IMA in a still picture.

Incidentally, in the edit processing unit 2BC, when video materials including the near-in-point material object OMA are successively displayed, the time code display in the window W1 is also updated successively. Furthermore, even when the frame at the end of the near-in-point material object IMA is displayed in a still picture, the edit processing unit 2BC successively updates the time code display in the window W1, and thereby enables the operator to confirm that the video material to be edited is being previewed even when the display is a still picture.

Now, when the time length tZA has elapsed, the edit processing unit 2BC, as an affirmative result is obtained at step SP58, moves on to step SP59, where it sets the playback pointer reading so as to designate the beginning of the corresponding near-out-point material object OMA.

Then the edit processing unit 2BC, after displaying the frame of the near-out-point material object OMA designated by this playback pointer reading in the window W1, goes on from step SP60 to step SP61, where it advances the playback pointer reading by a value of 1.

Next the edit processing unit 2BC moves on to step SP62, and judges whether or not the frame indicated by the playback pointer reading corresponds to the time code EA of the out-point in the near-out-point material object OMA. If a negative result is obtained here, the edit processing unit 2BC will return to step SP60, and display in the window W1 a video signal corresponding to this playback pointer reading advanced by a value of 1.

The edit processing unit 2BC starts playing back the near-out-point material object OMA, recorded in the hard disk unit 2, from the beginning, repeats the processing procedure in the sequence of SP60-SP61-SP62-SP60, and successively displays contents of this near-out-point material object OMA in the window W1. As it plays back in this state the near-out-point material object OMA to its end, it moves on from step SP62 to step SP63 because an affirmative result is obtained at step SP62, and the edit processing unit 2BC displays the frame SE of this out-point in the window W1.

Figure 13:
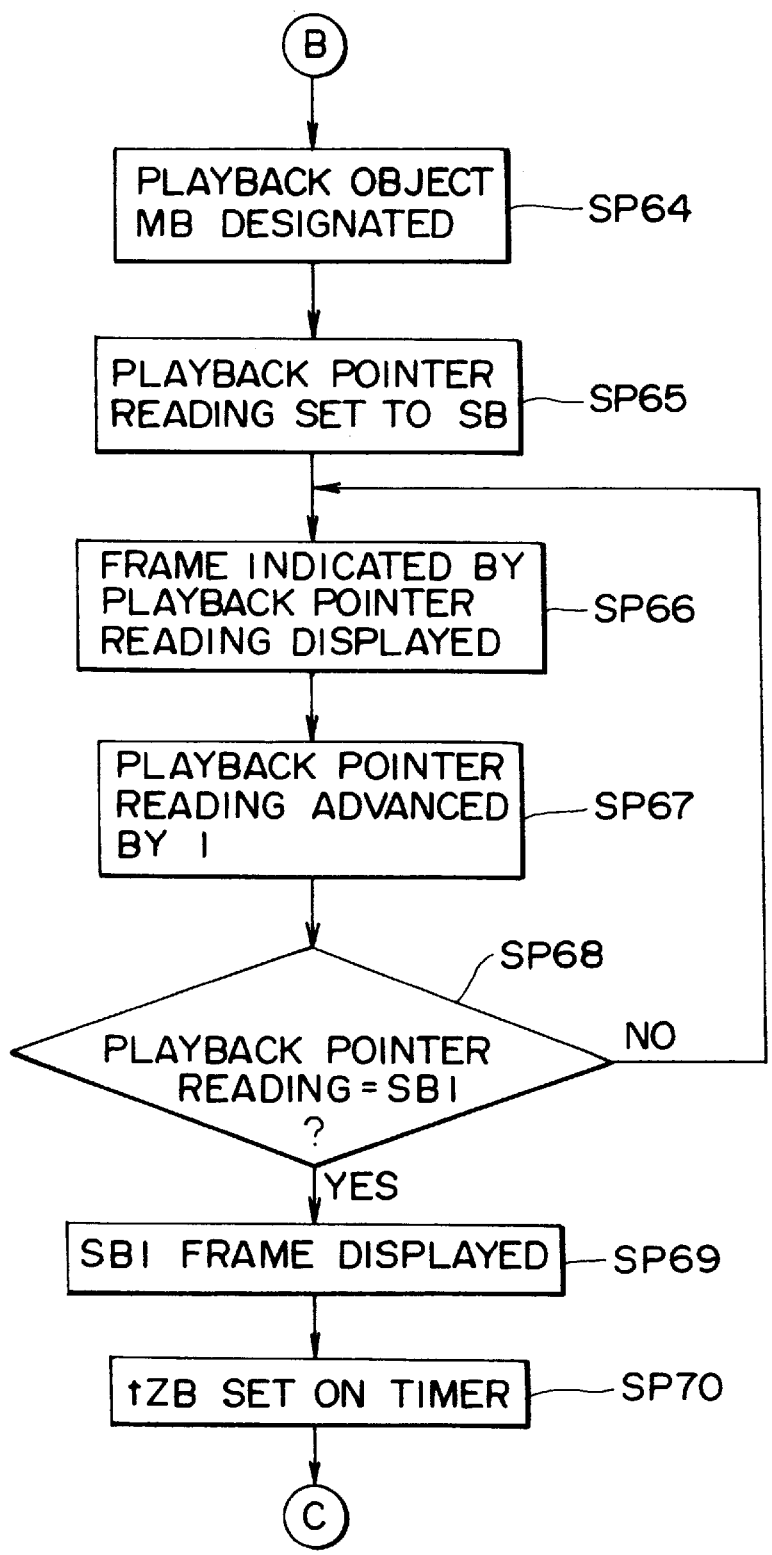
FIG. 13 is a flow chart showing the sequence of processing continuing from FIG. 12.

Then, as shown in FIG. 13, the edit processing unit 2BC goes on to step SP64, and designates a playback object MB following the operator-designated playback object MA.

Next the edit processing unit 2BC moves on to step SP65, and sets a playback pointer reading corresponding to the in-point of this playback object MB.

Next the edit processing unit 2BC moves on to step SP66, where it instructs a video material to be worked on (a frame) to be read out of the hard disk unit 2 on the basis of this playback pointer reading, and displays the played-back picture designated by this pointer in the window W1 of the display unit 8. Then the edit processing unit 2BC goes onto step SP67, where it advances the playback pointer reading by a value of 1, and further moves on to step SP68. Here the edit processing unit 2BC judges whether or not the frame indicated by this playback pointer reading corresponds to the time code SB1 at the end of the near-in-point material object IMB. If a negative result is obtained here, the edit processing unit 2BC will return to step SP66, and display in the window W1 the video signal corresponding to this playback pointer advanced by 1.

The edit processing unit 2BC, with respect to the near-out-point material object OMA and the near-in-point material object IMB recorded in the hard disk unit 2, after playing back from the beginning till the out-point of the near-out-point material object OMA, starts playing back the near-in-point material object IMB from the in-point, repeats the processing procedure in the sequence of SP66-SP67-SP68-SP66, and successively displays contents of this near-in-point material object IMB in the window W1. As it plays back in this state the near-in-point material object IMB to its end, it moves on from step SP68 to step SP69 because an affirmative result is obtained at step SP68, and the edit processing unit 2BC displays the end frame SB1 in the window W1.

Figure 14:
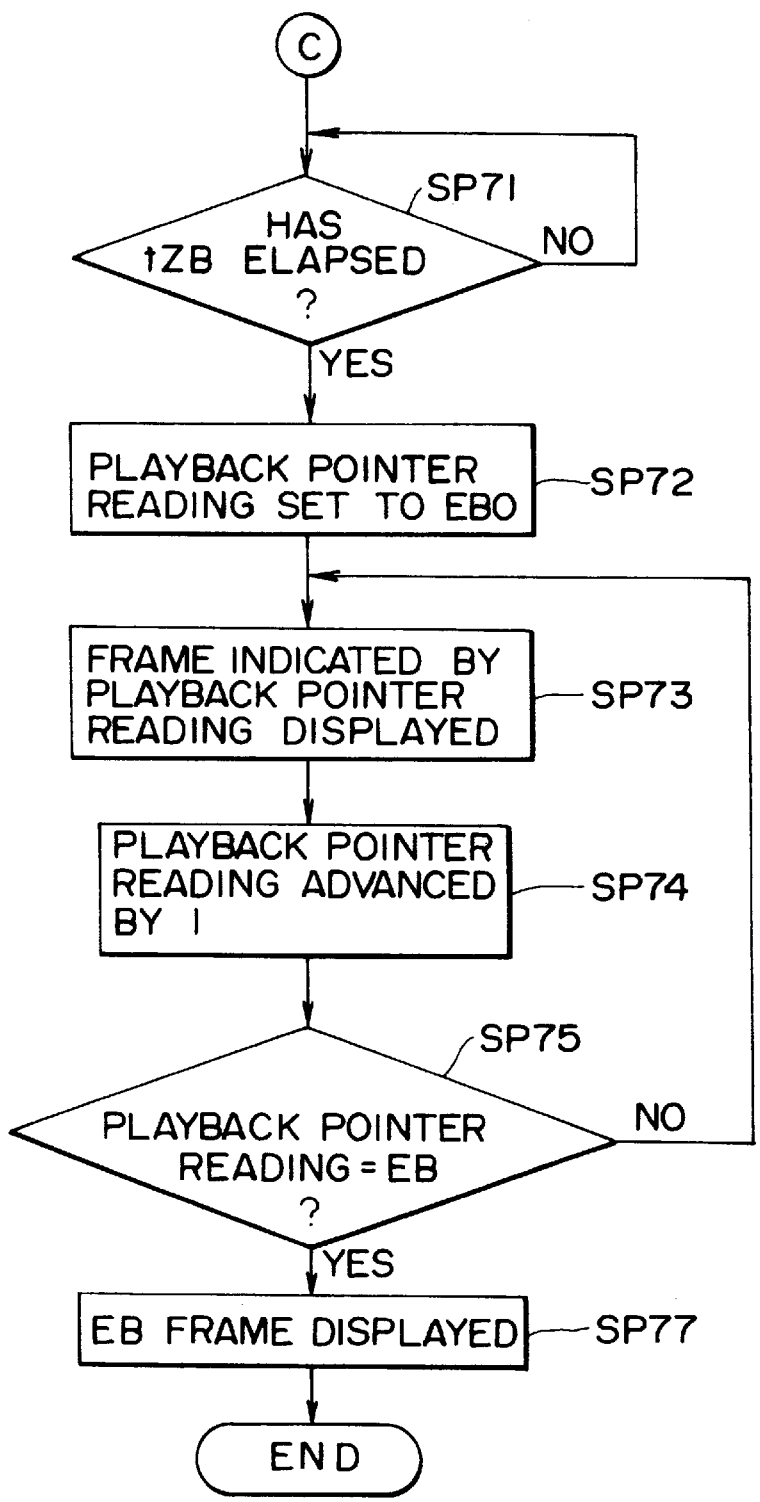
FIG. 14 is a flow chart showing the sequence of processing continuing from FIG. 13.

Then the edit processing unit 2BC moves on to step SP70, where it sets a prescribed length of time tZB in the built-in timer. This time length tZB here is the period from the end of the near-in-point material object IMB to the beginning of the corresponding near-out-point material object OMB. After setting the timer in this way, the edit processing unit 2BC, as shown in FIG. 14, goes on to step SP71, where the edit processing unit 2BC judges whether or not the time length tZB set in the timer has elapsed. If the result is negative, it will repeat step SP71.

The edit processing unit 2BC, for the near-in-point material object IMB as well, when it reaches its end, displays the still picture of this end in the window W1, and awaits the lapse of the period tZB. Thus, also when previewing the near-in-point material object IMB and the near-out-point material object OMB of the objects of editing taken into the hard disk unit 2, the editing apparatus 1 displays, with respect to video materials which are located between these near-in-point material object IMB and near-out-point material object OMB but not taken into the hard disk unit 2, the frame at the end of the near-in-point material object IMB in a still picture.

Now, when the time length tZB has elapsed, the edit processing unit 2BC, as an affirmative result is obtained at step SP71, moves on to step SP72, where it sets the playback pointer reading so as to designate the beginning of the corresponding near-out-point material object OMB. Then the edit processing unit 2BC, after displaying the frame of the near-out-point material object OMB designated by this playback pointer reading in the window W1, goes on to step SP74, where it advances the playback pointer reading by a value of 1.

Next the edit processing unit 2BC moves on to step SP75, and judges whether or not the frame indicated by playback pointer reading corresponds to the time code EB of the out-point in the near-out-point material object OMB. If a negative result is obtained here, the edit processing unit 2BC will return to step SP73, and display in the window W1 a video signal corresponding to this playback pointer reading advanced by a value of 1.

The edit processing unit 2BC starts playing back the near-out-point material object OMB, recorded in the hard disk unit 2, from the beginning, repeats the processing procedure in the sequence of SP73-SP74-SP75-SP73, and successively displays contents of this near-out-point material object OMB in the window W1. As it plays back in this state the near-out-point material object OMB to its out-point, it moves on from step SP75 to step SP76 because an affirmative result is obtained at step SP75, and the edit processing unit 2BC, after displaying the frame EB of this out-point in the window W1, goes on to step SP77 to complete this processing procedure.

These processings shown from FIG. 3 to FIG. 14 enable the edit processing unit 2BC to selectively take in only those pictures which are near in-points or out-points out of the objects of editing, and to execute previewing with the pictures taken in. This selective taking-in of only the pictures near in-points or out-points enables editing work to be accomplished with a hard disk unit 2 of only a small capacity. At the same time, downgrading the resolution serves to reduce the required capacity of the hard disk unit 2.

On the other hand, when the operator selects previewing with a designation of special effects other than this cut editing such as wipes and dissolves, the edit processing unit 2BC controls the special effect filters 2BE, executes filtering as intended by the operator upon the video signals supplied to the window between the near-out-point material object OMA and the near-in-point material object IMB, and displays the processed picture in the window W1.

FIG. 15 is a chart showing an editing list of in-points, out-points and special effects set by the operator. As the operator successively designates in-points and out-points, the edit processing unit 2BC provisionally generates this editing list and, as the operator completes previewing of each editing material and gives commands of editing decision, the edit processing unit 2BC successively updates the provisionally generated editing list to bring it to completion. Further in response to the operator's actions, the edit processing unit 2BC adds a prescribed file name to this completed editing list, records on a recording medium, and displays it on the display unit 8 as required.

Here, "0001I" on the first line denotes the in-point of scene 0001. It indicates that recording is started from a time code (extended time code) of "00+00+00:00:00:00" (reference TB) on the magnetic tape to record the result of editing and that the corresponding time code (extended time code) on the playback side magnetic tape on which editing materials at this time are recorded are "01+01+00:02:03:15" (source ETC).

Corresponding to the above, "00010" on the following second line denotes the out-point of scene 0001, and "0002I1" and "0002I2" on the third and fourth lines, respectively, denote in-points having transition by special effects, indicating that filtering by V-wipe is accomplished in a transition time of five seconds. To the out-points corresponding to these third and fourth lines, "000201" and "000202" on the fifth and sixth lines respectively correspond. Thus a special effect of V-WipeA is accomplished between "0002I1" and "000201", and another special effect of V-WipeB, between "0002I2" and "000202".

Having completed the editing list in this manner, the edit processing unit 2BC controls the batch processing management unit 2BF to execute planning of batch processing. For editing points involving special effects, the edit processing unit 2BC records in advance the video signals of the results of editing subjected to special effects into the hard disk unit 2 (step SP43 in FIG. 3).

FIG. 16 is a schematic diagram for use in describing the processing of such special effects, where two scenes, A and B, are to be connected by a wipe, dissolve or the like (FIGS. 16A and 16B).

In this case, the edit processing unit 2BC records in advance the video signals for the transitional period EAB subjected to special effects by controlling the actions of the external device controller 2A and thereby executing the processing procedure shown in FIG. 17.

The edit processing unit 2BC moves on from step SP80 to step SP81, and takes the video signals for the transitional period EA (AO1-AO2 segment) in scene A into the hard disk unit 2. At this time, the edit processing unit 2BC controls the thinning-out circuit 2CB to stop its action, and takes in the video signals for this transitional period EA without downgrading their resolution.

Then the edit processing unit 2BC moves on to step SP82, and takes the video signals for the transitional period EB (BI1-BI2 segment) in the following scene B into the hard disk unit 2. At this time, the edit processing unit 2BC, as in the case of scene A, takes in the video signals for this transitional period EB without downgrading their resolution.

Next the edit processing unit 2BC, moving on to step SP83, successively synthesizes these two sets of video signals recorded in the hard disk unit 2 with the special effect filters 2BC, generates the result of edition in the transitional period EAB (PEI-PEO segment), and records this generated result of edition into the hard disk unit 2.

Figure 18:
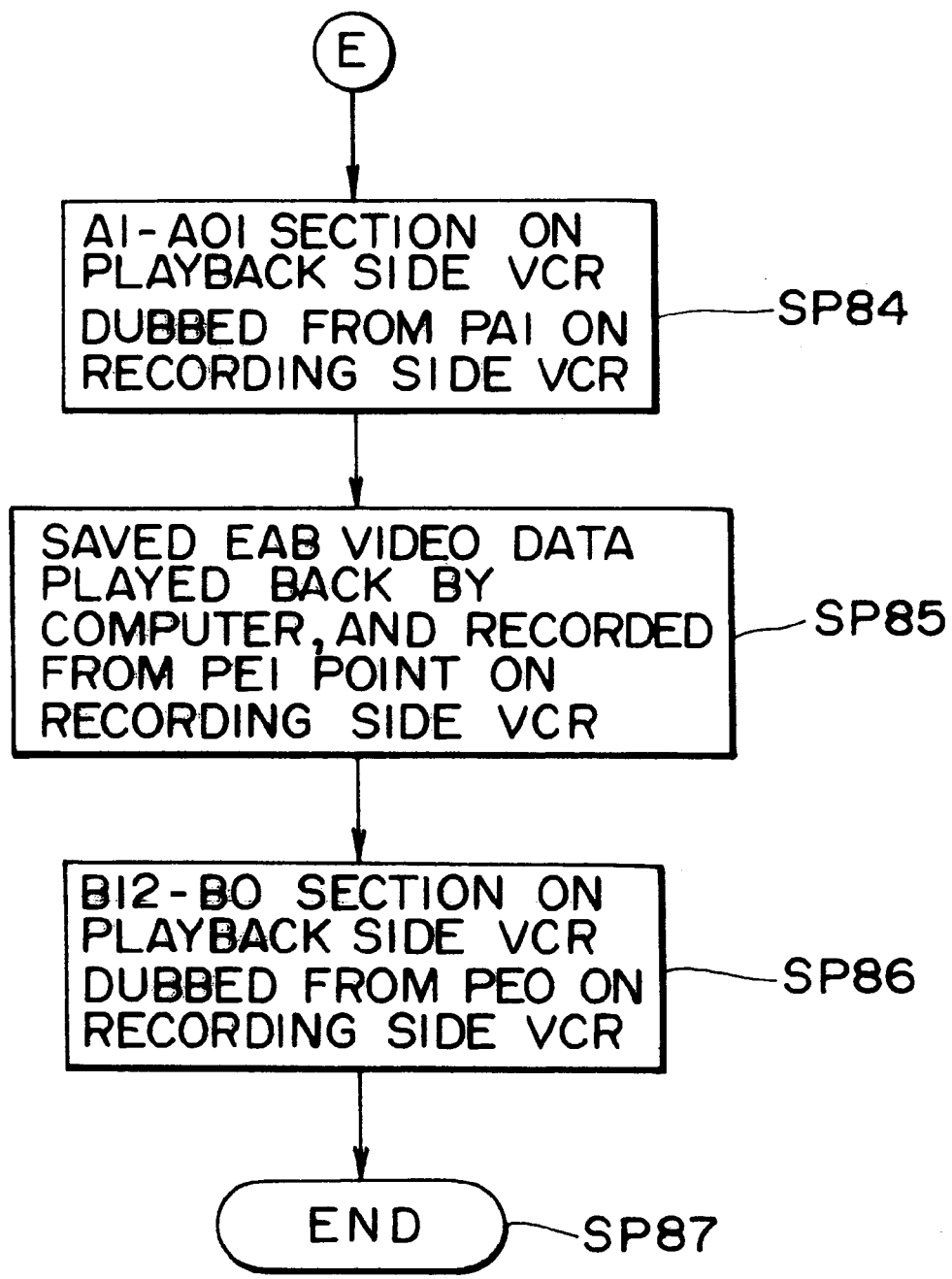
FIG. 18 is a flow chart showing the sequence of processing continuing from FIG. 17.

Having generated in advance the video signals for the transitional period EAB in this manner, the edit processing unit 2BC, as shown in FIG. 18, controls the actions of the playback side VCR 5 at step SP84 so as to start playing back the video signals for the AI~AO1 segment, which is a scene before the transitional period EAB, and records these video signals into the recording side VCR 6. At this time, the edit processing unit 2BC records the video signals of this scene A into the recording side VCR 6 by insertion according to the editing list into the magnetic tape on which the time code was recorded in advance.

Having recorded the video signals up to immediately before the transitional period EAB, the edit processing unit 2BC, at the next step SP85, records into the recording side VCR 6 the video signals of the transitional period EAB saved by recording into the hard disk unit 2. Further, when it has recorded the video signals for this transitional period EAB, the edit processing unit 2BC goes on to step SP86, where it plays back the video signals for the BI2~BO segment of the following scene B, records them into the recording side VCR 6, and moves on to step SP87 to complete this processing procedure. The editing apparatus 1 is thereby enabled, even when video signals near editing points are selectively entered with their data quantity reduced, to effectively avoid deterioration of picture quality and give various special effects.

Figure 19:
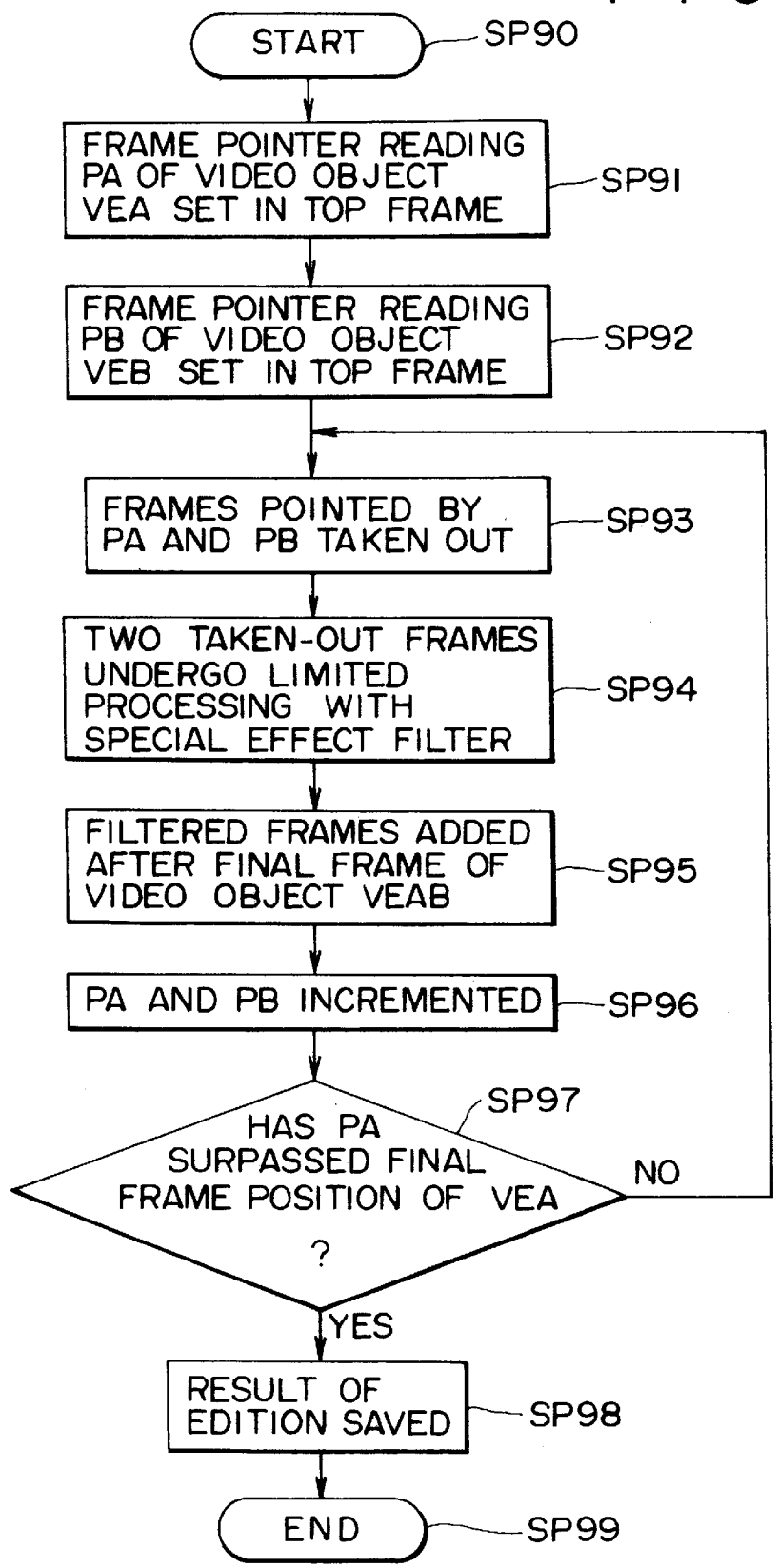
FIG. 19 is a flow chart showing the sequence of processing during a transitional period in the processing procedure of FIG. 17.

FIG. 19 is a flow chart showing the processing procedure by the edit processing unit 2BC at step SP83 described above with reference to FIG. 17. The edit processing unit 2BC, executing this processing procedure, -synthesizes the two sets of video signals recorded in the hard disk unit 2 to generate video signals for the transitional period EAB.

Thus the edit processing unit 2BC, going on from step SP90 to step SP91, sets a frame pointer reading PA, specifying a frame of scene A, so that it point to the leading frame of the transitional period EA. Then the edit processing unit 2BC, moving on to step SP92, similarly sets a frame pointer reading PB, specifying a frame of scene B, so that it point to the leading frame of the transitional period PB.

Then the edit processing unit 2BC, going on to step SP93, reads out video signals designated by two frame pointer readings PA and PB from the hard disk unit 2, and executes filtering by operator-designated special effects on these read-out video signals at the following step SP94. Next the edit processing section 2BC, at step SP95, records the result of this filtering into the hard disk unit 2 as video object for the transitional period EAB. At this time, the edit processing unit 2BC, when the video object for the same transitional period EAB is already recorded in the hard disk unit 2, adds the generated video signals to the end of this video object and records the augmented video object into the hard disk unit 2.

Then the edit processing unit 2BC goes on to step SP96, where it advances the two frame pointer readings PA and PB by a value of 1 each, and moves further on to step SP97, where it judges whether or not the frame designated by these frame pointer readings PA and PB has surpassed the final frame of the transitional period EAB. If a negative object is obtained here, the edit processing unit 2BC will return to step SP93, and repeat the same processing for the ensuing frames. The edit processing unit 2BC then repeats the processing procedure of steps SP93-SP94-SP95-SP96-SP97-SP93, and synthesizes video signals for the transitional period EAB by successively filtering the frames of scene A and scene B.

Having successively synthesized video signals for the transitional period EAB in this manner, the edit processing unit 2BC is enabled to obtain an affirmative result at step SP97. In this case, the edit processing unit 2BC moves on from step SP97 to step SP98 and, after successively adding a prescribed file name to the video signals resulting from the editing, which are recorded in the hard disk unit 2, and saving the named video signals, goes further on to step SP99 to complete this processing procedure.

Figure 20:
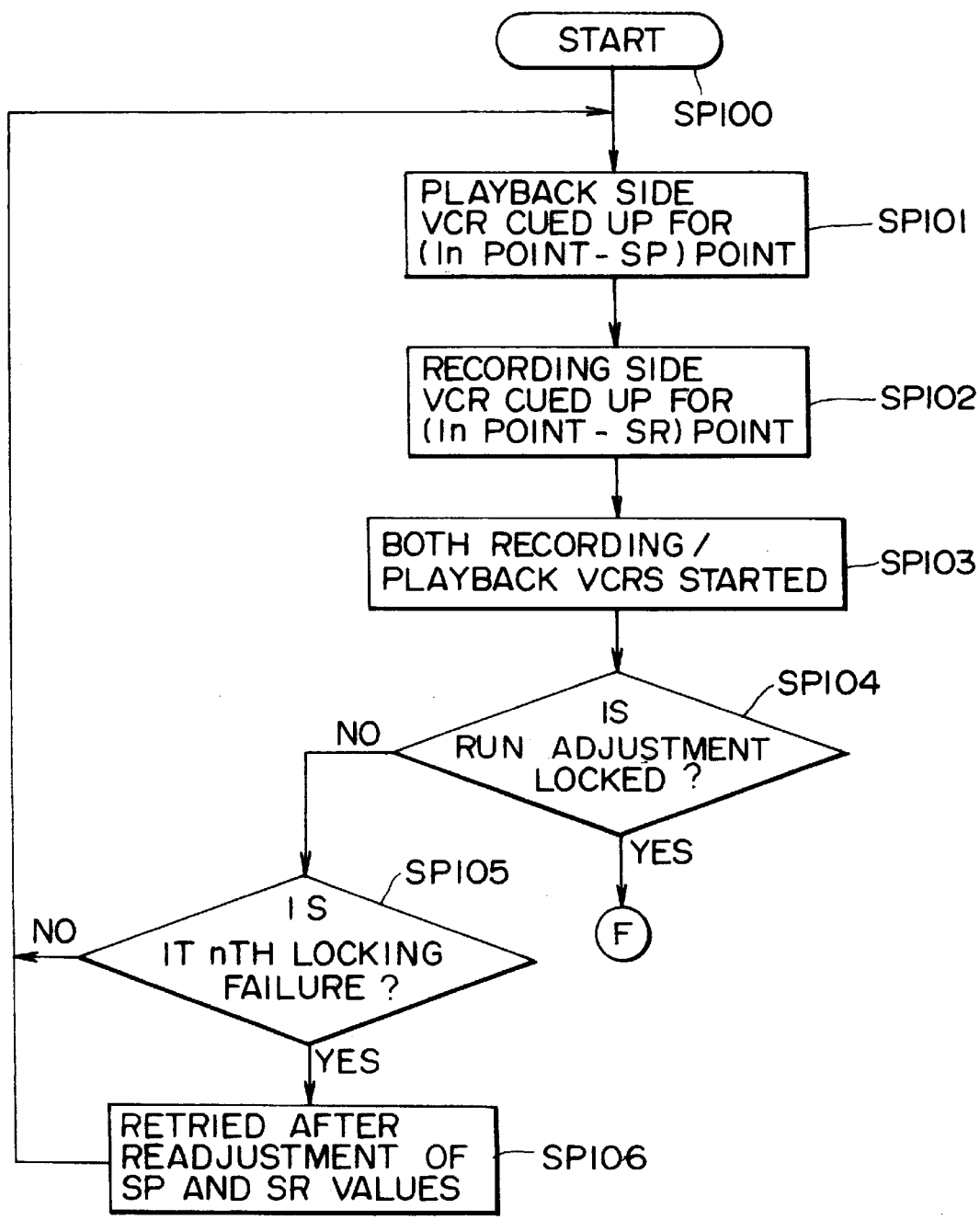
FIG. 20 is a flow chart showing the sequence of dubbing in the processing procedure of FIG. 18.

FIG. 20 is a flow chart showing the procedure of processing by the edit processing unit 2BC at step SP84 described above with reference to FIG. 18. The edit processing unit 2BC, moving on from step SP100 to step SP101, issues a control command to the playback side VCR 5 to cue up an in-point AI of scene A. Then the edit processing unit 2BC goes on to step SP102, where it issues a control command to the recording side VCR 6 to cue up the position of recording start by insert-editing. Incidentally, at these steps SP101 and SP102, the edit processing unit 2BC sets, as cueing-up positions, positions back from the in-point and the position or recording start, respectively, by prescribed numbers of frames SP and SR required for run adjustment.

Next the edit processing unit 2BC moves on to step SP103, where it causes the recording side VCR 6 and the playback side VCR 5 to start playing back, and further on to step SP104. Here the edit processing unit 2BC, with reference to the time codes of the playback side VCR 5 and the recording side VCR 6 detected via the time code management unit 2BA, judges whether or not the run adjustment of the two VCRs has been locked and, if a negative result is obtained, will go on to step SP105.

Then the edit processing unit 2BC judges whether or not locking failure has taken place by a prescribed number, n times, and if a negative result is obtained here, it returns to step SP101, where it executes cueing-up again and causes the playback side VCR 5 and the recording side VCR 6 to play back. The edit processing unit 2BC repeats the processing procedure of steps SP101-SP102-SP103-SP104-SP105-SP101, and if run adjustments have been attempted by the prescribed number, n times, and still fail to achieve locking, it will go on from step SP105 to SP106. Here the edit processing unit 2BC, after resetting positions back from the in-point and the position for recording start by the numbers of frames SP and SR, respectively, returns to step SP101. If the edit processing unit 2BC still fails to lock a run adjustment in repeated attempts, it will alter the conditions of run adjustment, and repeat the same processing.

If, conversely, the actions of the two VCRs 5 and 6 are synchronized by run adjustment, the edit processing unit 2BC will go on from step SP104 to step SP108 (FIG. 21) because an affirmative result is obtained at step SP104. Here the edit processing unit 2BC judges whether or not the time codes of the playback side VCR 5 and the recording side VCR 6 coincide with the time codes of the in-point and the position of recording start, respectively, and if a negative result is obtained here, it will repeat step SP108.

If, conversely, an affirmative result is obtained at step SP108, the edit processing unit 2BC will move on to step SP109, and issue a control command to start recording by the recording side VCR 6. The edit processing unit 2BC thereby starts recording by the recording side VCR 6 from the in-point of the video signals played back by the playback side VCR 5.

Then the edit processing unit 2BC moves on to step SP110, judges here whether or not the time code of the playback side VCR 5 coincides with the time code immediately before the start point of the transitional period EA and, if a negative result is obtained here, will repeat step SP110 or, if an affirmative result is obtained, it will go on to step SP111. The edit processing unit 2BC, after having the recording side VCR 6 record the video signals played back by the playback side VCR 5 from the in-point till the position immediately before the start of the transitional period EA, stops the actions of the two VCRs 5 and 6, and moves on to step SP112 to complete this processing procedure.

Figure 21:
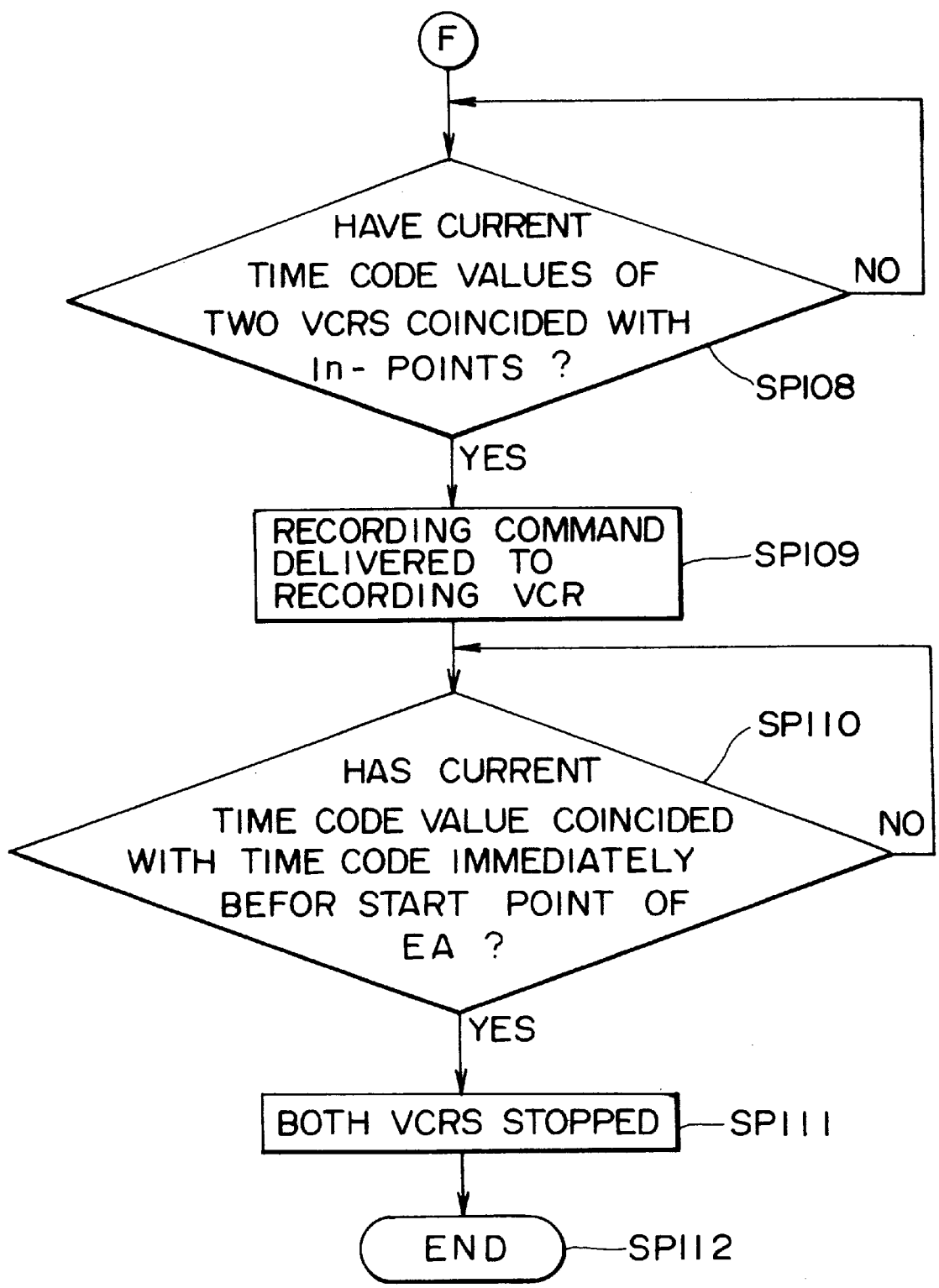
FIG. 21 is a flow chart showing the sequence of processing continuing from FIG. 20.

The edit processing unit 2BC, when dubbing video signals from the playback side VCR 5 to the recording side VCR 6, also executes the same processing procedure as that shown in FIGS. 20 and 21 to process the video signals from the point of time at the end of the transitional period EB of scene B till the out-point, described above with reference to step SP86 in FIG. 18.

Figure 22:
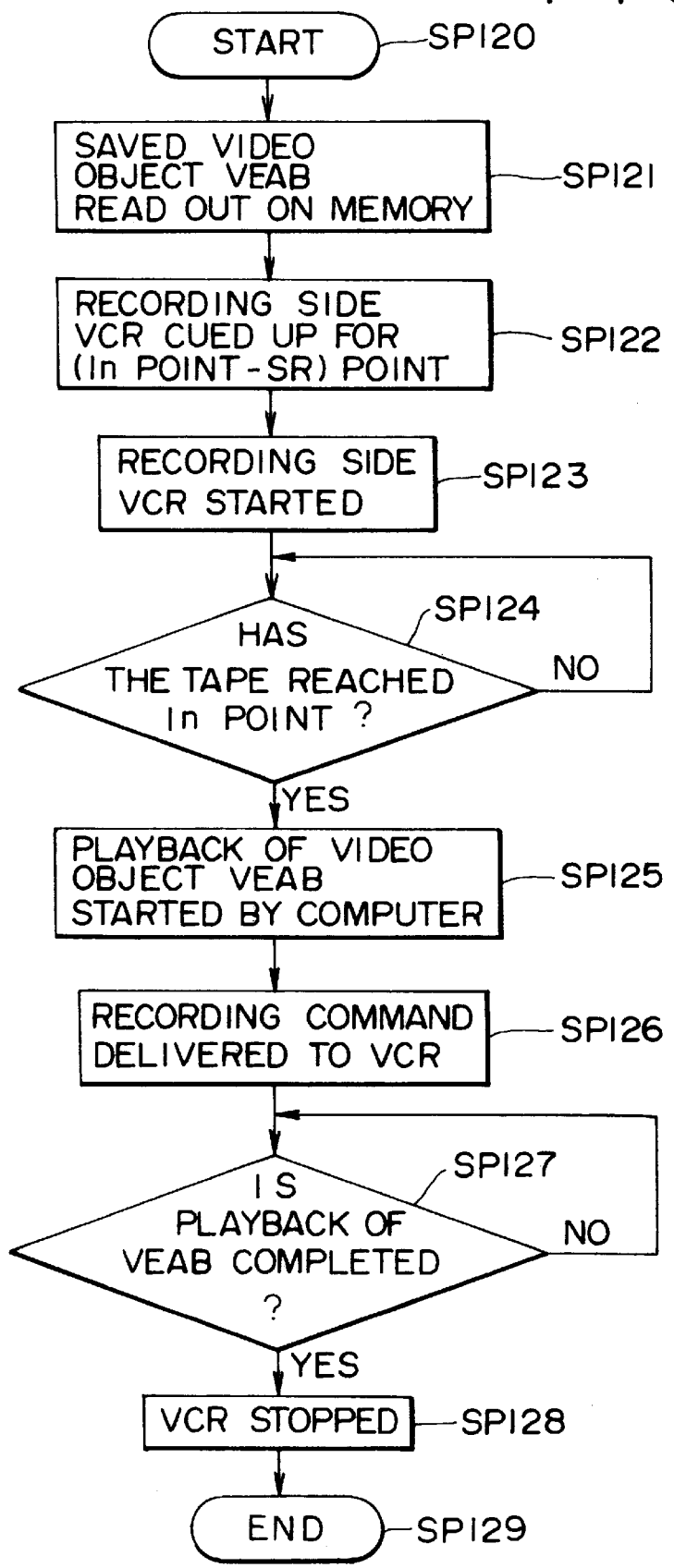
FIG. 22 is a flow chart for use in describing the recording of video signals during the transitional period in the processing procedure of FIG. 18.

FIG. 22 is a flow chart showing the procedure of processing described above with reference to step SP85 in FIG. 18. By executing this processing procedure, the edit processing unit 2BC records in the recording side VCR 6 the result of editing for the transitional period EAB, prepared in advance and recorded in the hard disk unit 2.

Thus the edit processing unit 2BC, moving on from step SP120 to step SP121, reads out the result of editing for the transitional period EAB, recorded in the hard disk unit 2, into a temporary area of the memory space. Then the memory unit 2 goes on to step SP122, and cues up here the recording side VCR 6 in a position back from the position of recording start of this editing result by a prescribed number of frames.

Next the edit processing unit 2BC goes on to step SP123, where it instructs the recording side VCR 6 to start playing back, at the following step SP124 judges whether or not the time code of the recording side VCR 6 coincides with the time code of the start position of the transitional period EAB and, if a negative result is obtained here, will repeat step SP124.

The edit processing unit 2BC, holding the recording side VCR 6 in a playback state until the start position of the transitional period EAB, moves on to step SP125. Here it starts playing back the video signals of the transitional period EAB, held in the memory, at a playback speed corresponding to the recording speed of the recording side VCR 6. Then the edit processing unit 2BC goes on to step SP126, where it delivers a recording command to the recording side VCR 6, and causes the recording side VCR 6 to record the successively played back video signals of the transitional period EAB.

Next the edit processing unit 2BC moves on to step SP127, where it judges whether or not the recording of the video signals of the transitional period EAB has been completed and, if a negative result is obtained here, will repeat step SP127 or, if an affirmative result is obtained, goes further on to step SP128. Here the edit processing unit 2BC, after effecting control to stop the action of the recording side VCR 6, moves on to step SP129 to complete this processing procedure.

Figures 23A, 23B:
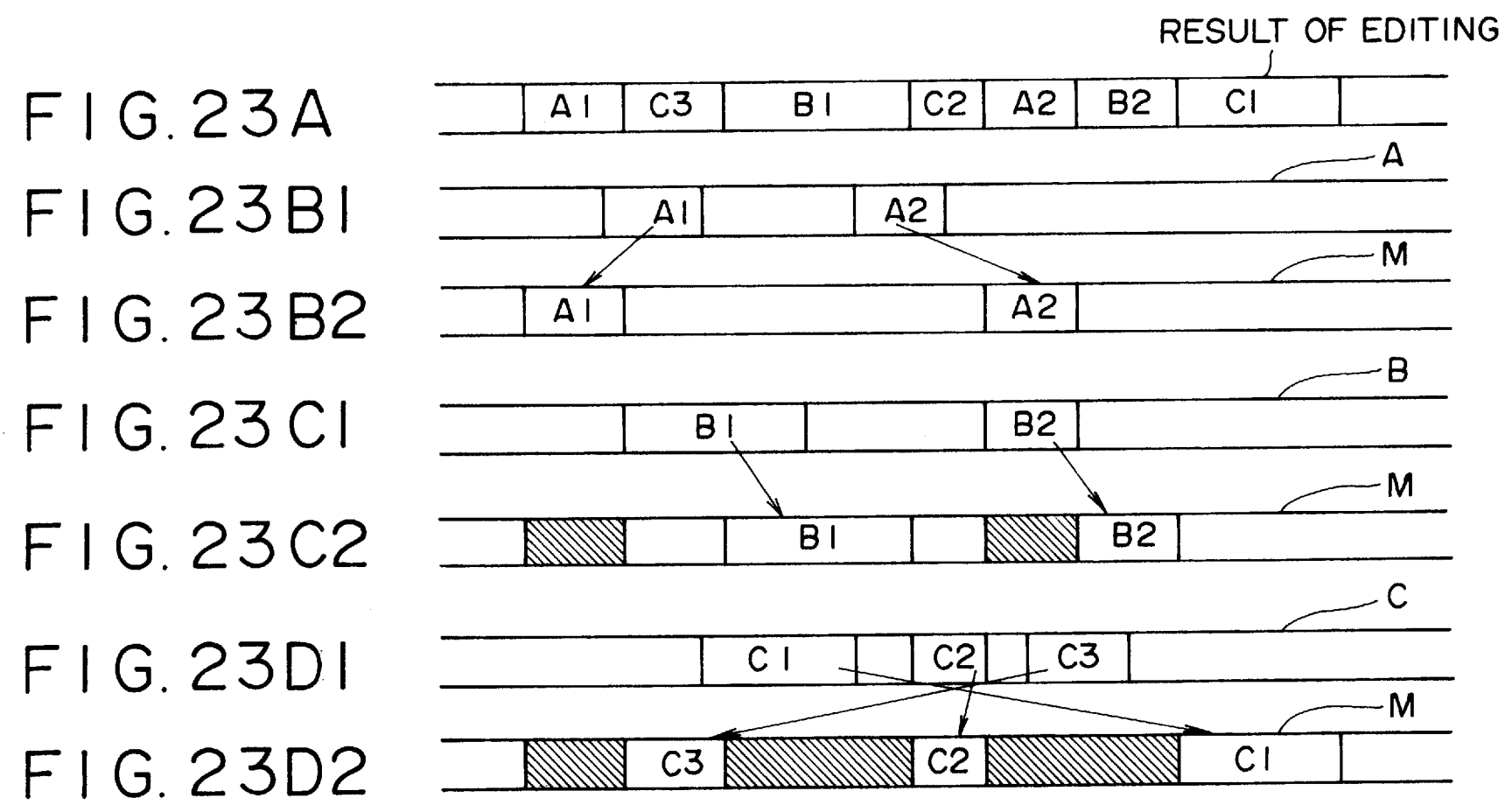

FIG. 23 is a schematic diagram illustrating the planning of batch processing described above with reference to step SP42 of FIG. 3. Where, for instance, video materials recorded on three magnetic tapes A, B and C are to be edited and recorded on another magnetic tape M (FIG. 23A), the edit processing unit 2BC, controlling the batch processing management unit 2BF, first successively records time codes on the magnetic tape M on which the result of this editing is to be recorded. Further the edit processing unit 2BC instructs the operator to set the first magnetic tape A (FIG. 23B1), selected by the planning of batch processing, in the playback side VCR 5, and insert-records scenes A1 and A2, set on this first magnetic tape A, successively on the magnetic tape M (FIG. 23B2).

Then the edit processing unit 2BC similarly instructs the operator to set the second magnetic tape B (FIG. 23C1), selected by the planning of batch processing, in the playback side VCR 5, and insert-records scenes B1 and B2, set on this second magnetic tape B, successively on the magnetic tape M (FIG. 23C2). Further the edit processing unit 2BC similarly instructs the operator to set the last remaining third magnetic tape C (FIG. 23D1) in the playback side VCR 5, and insert-records scenes C1, C2 and C3, set on this third magnetic tape C, successively on the magnetic tape M (FIG. 23D2).

The edit processing unit 2BC insert-records on the magnetic tape M each operator-set scene by batch processing on a tape-by-tape basis for the magnetic tapes A, B and C, and thereby reduces the required frequency of changing the magnetic tapes A, B and C.

Figure 24:
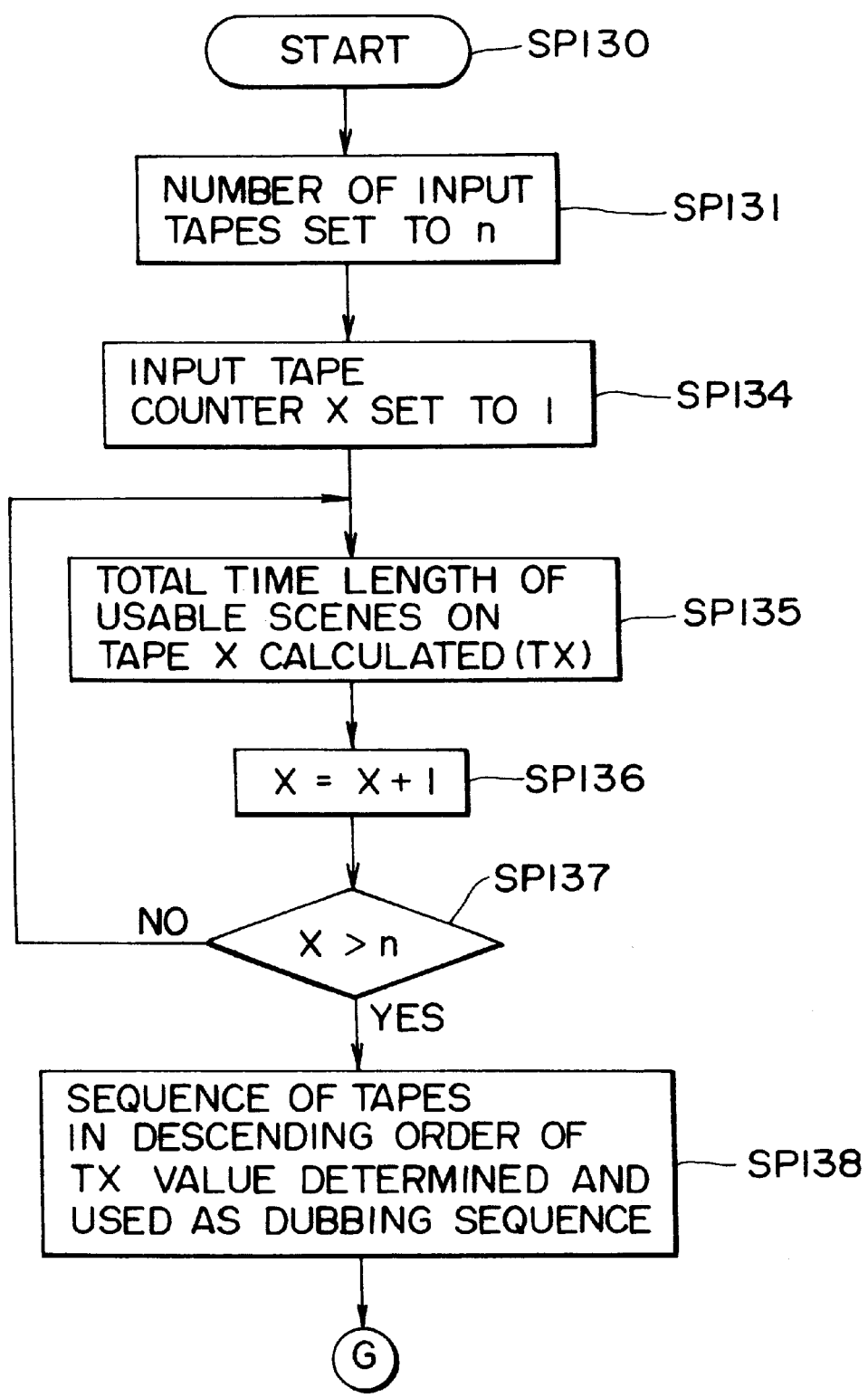
FIG. 24 is a flow chart showing the sequence of planning the batch processing.

At this time the edit processing unit 2BC plans batch processing by executing the processing procedure shown in FIG. 24 in the batch processing management unit 2BF, records on the magnetic tape M scenes from the input tapes in the ascending order of the video material length, and thereby enables the result of editing to be recorded on the magnetic tape M without requiring the operator to monitor the editing apparatus frequently. Incidentally, in this processing procedure shown in FIG. 24, the planning and the dubbing dependent on the result of planning are shown consecutively.

Thus the edit processing unit 2BC moves on from step SP130 to step SP131, where it detects the number n of input tapes from the time code map. Then the edit processing unit 2BC goes on to step SP134, where it sets the count X of an input tape counter to 1. The input tape counter here is a counter to specify input tapes.

Next the edit processing unit 2BC moves on to step SP135, where it detects the total time length TX of materials to be recorded on a magnetic tape (magnetic tape X) of a count X by the recording side VCR 6. The total time length TX here is detected from the time code map. Then the edit processing unit 2BC goes on to step SP136, where it advances the count X of the input tape counter by 1, and further on to step SP137. Here the edit processing unit 2BC judges whether or not the count X of the input tape counter has surpassed the number n of input tapes and, if a negative result is obtained, will return to step SP135.

The edit processing unit 2BC repeats the processing procedure of steps SP135-SP136-SP137-SP135, and detects for each input tape the total time length TX of materials to be recorded on the magnetic tape M by the recording side VCR 6. Having detected the total time length TX for every tape in this manner, the edit processing unit 2BC moves on to step SP138, where it lines up the tape IDs of the input tapes in the ascending order of the total time length TX, and the order of this arrangement is made the sequence in which the input tapes are to be loaded into the playback side VCR 5.

Figure 25:
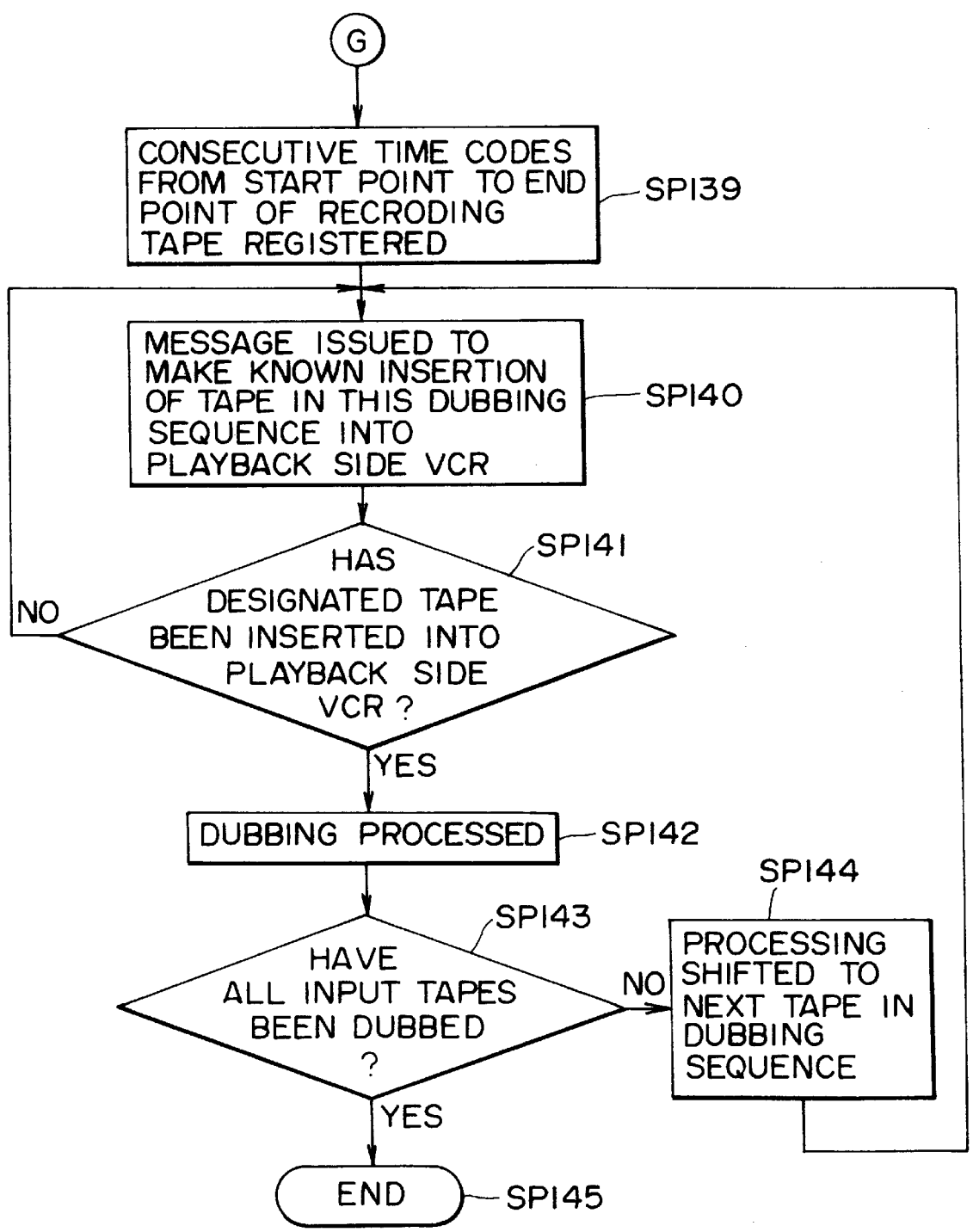
FIG. 25 is a flow chart showing the sequence of processing continuing from FIG. 24.

As shown in FIG. 25, then the edit processing unit 2BC records at step SP139 consecutive time codes on the magnetic tape loaded into the recording side VCR 6. Next the edit processing unit 2BC, at step SP140, urges the operator to load the playback side VCR 5 with a magnetic tape according to the sequence set at step SP138, and at the following step SP141 judges whether or not the playback side VCR 5 has been loaded with the magnetic tape corresponding to the status of the playback side VCR 5 detected via the external device controller 2A. If a negative result is obtained here, the edit processing unit 2BC will return to step SP140, and again urge the operator to load the magnetic tape or, if an affirmative result is obtained, will move on to step SP142. Here the edit processing unit 2BC plays back the applicable video signals on the playback side VCR 5, and records the played-back video signals into the recording side VCR 6. Upon completion of this recording, the edit processing unit 2BC goes onto step SP143, where it judges whether or not all the input magnetic tapes have been dubbed and, if a negative result is obtained here, will move on to step SP144.

The edit processing unit 2BC switches the magnetic tape to be dubbed to the following one, and goes on to step SP140 to urge the operator to load this tape. If, conversely, all the input magnetic tapes have been dubbed, an affirmative result will be obtained at step SP143, and the edit processing unit 2BC will move on to step SP145 to complete this processing procedure.

Figure 26:
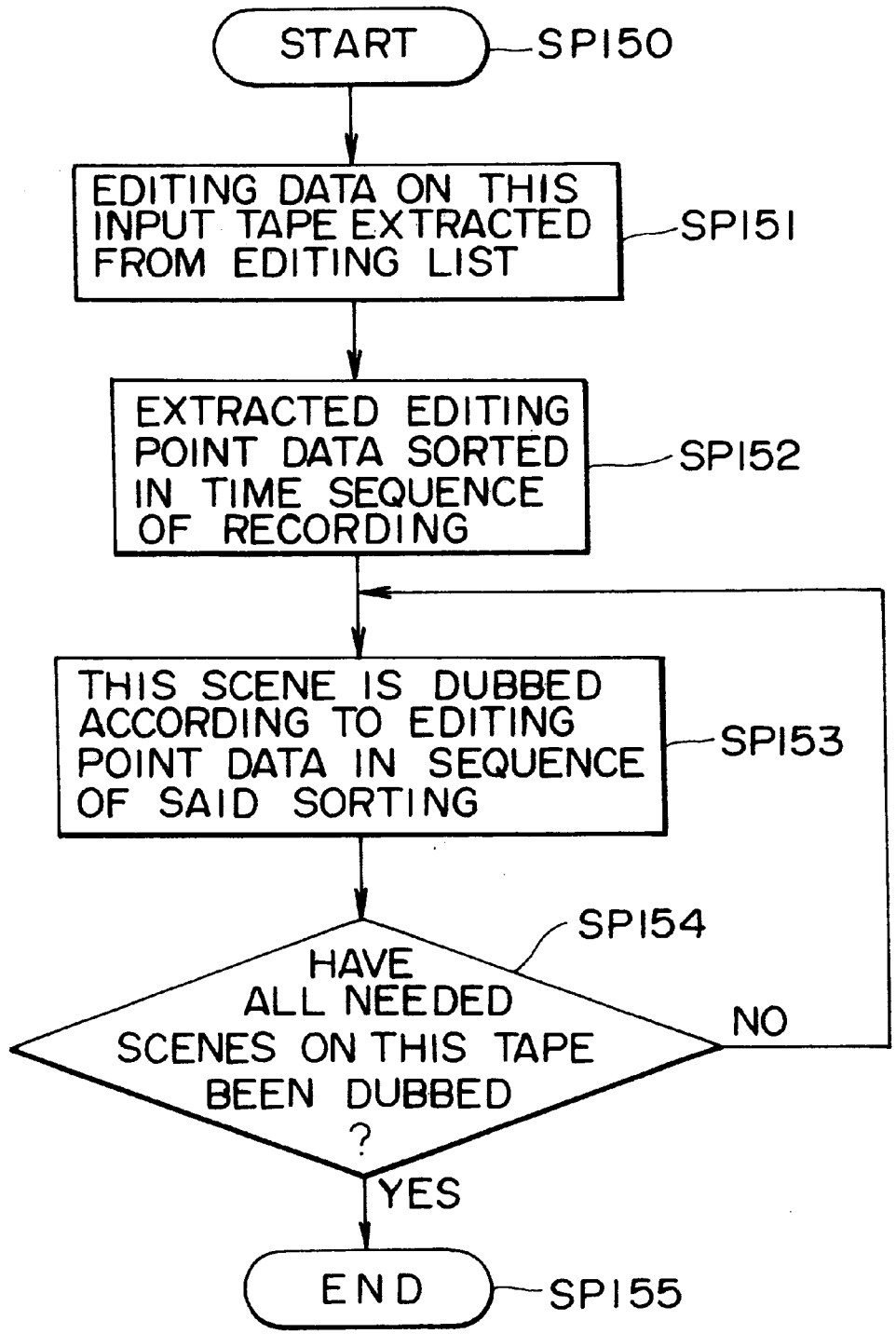
FIG. 26 is a flow chart showing the sequence of dubbing by planning.

FIG. 26 is a flow chart showing the processing procedure at step SP142 of FIG. 25 in detail. By executing this processing procedure, the edit processing unit 2BC records on the magnetic tape loaded in the recording side VCR 6 video materials from the input magnetic tape selected according to planning by the batch processing management unit 2BF.

Thus the edit processing unit 2BC moves on from step SP150 to step SP151, where it extracts from the editing list editing point data regarding the magnetic tape loaded in the playback side VCR 5. Then the edit processing unit 2BC goes on to step SP152, where it arranges the extracted editing data in the order of time codes of the recording side VCR 6.

Next the edit processing unit 2BC moves onto step SP153, where it causes the recording side VCR 6 to dub the scenes on the magnetic tape loaded in the playback side VCR 5 according to the editing point data in the order where they were arranged at step SP152. In this dubbing, the edit processing unit 2BC cues up the playback side VCR 5 and the recording side VCR 6, subjects them to run adjustment and causes them to dub the scenes by insert-recording.

Then the edit processing unit 2BC, going on to step SP154, judges whether or not all the scenes on the magnetic tape loaded in the playback side VCR 5 have been dubbed and, if a negative result is obtained, will repeat step SP153. If, conversely, all the scenes have been dubbed, which would give an affirmative result at step SP154, the edit processing unit 2BC will move on to step SP155 to complete this processing procedure.

Incidentally, in the editing using special effects described above with reference to FIG. 16, the edit processing unit 2BC executes the above-described processing procedure in this manner at the applicable timing in accordance with the plan formulated by the batch processing management unit 2BF.

In the foregoing configuration, in the editing apparatus 1, as the magnetic tape recording video materials, which are to be edited, is loaded into the playback side VCR 5 and the operator roughly designates in-points and out-points successively, video signals near each in-point and out-point are selectively recorded into the hard disk unit 2 (FIG. 5). In the editing apparatus 1, previewing and other processings are executed with these selectively taken-in video signals, so that editing work can be accomplished with a simple configuration, requiring no large-capacity hard disk unit 2.

Furthermore, the video signals taken into the hard disk unit 2 in this manner are downgraded in resolution by the thinning-out circuit 2CB, resulting in a reduction in data quantity. The editing apparatus 1 is thereby enabled to execute various aspects of editing work with a hard disk unit 2 of an even smaller capacity.

In taking in video signals around editing points in this manner, the editing apparatus 1 generates extended time codes by adding to the time code of each editing point a tape ID, which identifies a magnetic tape, and an in-tape ID, which identifies a scene to be edited, and these extended time codes constitute a time code map indicating the relationship of correspondence between all the magnetic tapes and the result of editing (FIG. 9).

The editing apparatus 1 is thereby enabled, when dubbing video signals from the playback side VCR 5 to the recording side VCR 6, relates various video materials to time codes on the recording side according to such time code maps so that, even where a plurality of magnetic tapes are to be edited, video materials recorded on the plurality of magnetic tapes can be subjected to unified management. Furthermore, only those video materials which are close to editing points are taken in and these taken-in video materials are related to the original video materials, so that pictures in which continuity among the partially taken-in video materials is ensured can be compiled and identity with the original video materials can be maintained.

Accordingly, in the editing apparatus 1, as video signals are taken in for the compilation of an editing list in this manner, pointer manipulation on the display screen of the display unit 8 (FIG. 10) enables the setting of in-points and out-points to be altered and special effects desired by the operator to be set, and operation according to a menu selected in the window W1 formed on this display screen enables the result of editing after these alterations and settings to be confirmed with the display in the window W1 so as to make possible execution of previewing. Further, in response to these alterations and settings, an editing list corresponding in time code is prepared.

If, then, two video materials are to be consecutively previewed by cut editing, for instance, video signals taken into the hard disk unit 2 are played back and displayed in the window W1 for the near-in-point part of the first video material, followed by displaying of the final frame of this near-in-point part of the video material in a still picture, and video signals for editing list compilation, recorded in the hard disk unit 2, are displayed for the near-out-point part. Further, with the out-point as border, video signals from an in-point are displayed for the second video material recorded in the hard disk unit 2 and, after the final frame of the video material near this in-point is displayed in a still picture, video signals for editing list compilation, recorded in the hard disk unit 2, are displayed for the near-out-point part.

Where two scenes are to be linked with a special effect, two video signals recorded in the hard disk unit 2 are connected with a special effect selected by the operator and displayed in the window W1, while immediately before and after the connection, video signals of each scene for editing list compilation, recorded in the hard disk unit 2, are displayed. This enables the operator, even if only those video signals which are close to editing points are taken into the hard disk unit 2 and previewed, can preview and manipulate them as if he or she had taken in and was previewing all the video signals, resulting in a corresponding improvement in manipulating ease.

Furthermore, the displaying of the time code in the upper part of the window W1 enables the operator to confirm the current preview position with this time code, resulting in a further improvement in manipulating ease.

In the editing apparatus 1, upon completion of the alteration of editing points and the choice of a special effect, the editing list is generated by the action of the operator (FIG. 15), and after that video signals resulting from editing are recorded into the recording side VCR 6 according to this editing list. In this process, in the editing apparatus 1, planning by batch processing is executed, and the playback duration is detected for every magnetic tape on which materials for editing are recorded. Further, the arrangement of magnetic tapes is set in the ascending order of the playback duration, and the operator instructs the loading of magnetic tapes into the playback side VCR 5 in the order of this arrangement.

In this manner, scenes selected by the operator from magnetic tapes, arranged in the ascending order of the playback duration, are successively insert-recorded into the recording side VCR 6, and the frequency of magnetic tape loading, where a plurality of magnetic tapes are to be used in the editing of video recorded materials, is drastically reduced. The successive insert-recording from magnetic tapes in the ascending order of playback duration enables the operator, after repeating magnetic time changes at short intervals of time immediately after the start of recording, to leave the editing apparatus 1 for the execution of some other work and thereby to enhance the efficiency of his or her work.

For special effects to synthesize two sets of video signals, these two sets of video signals are taken into the hard disk unit 2 in advance only for their transitional period EAB, and the taken-in video signals are synthesized and saved in the hard disk unit 2. This arrangement enables even a system configuration having no complex special effect apparatus to edit video signals with various special effects.

The foregoing configuration enables a hard disk unit of even a small capacity to execute various aspects of editing work by reducing the data quantity only of video signals near editing points, recording them into a hard disk unit and executing previews with these video signals, and thereby makes it possible to provide an editing apparatus of a simple configuration.

In the previewing process, a still picture and a time code are displayed for any video signals not taken into the hard disk unit, and this contributes to improving the handling ease when only those video signals which are close to editing points are to be taken in and previewed.

Furthermore, as the result of editing is recorded by batch processing for each magnetic tape and the magnetic tapes are successively processed in the ascending order of playback duration, the frequency of magnetic tape changes by the operator is reduced, resulting in a corresponding improvement in the efficiency of his or her work.

Where a special effect is to be added, the video signals to be processed are recorded into the hard disk unit only for the transitional period and the result of editing is held, so that even a system configuration having no complex special effect apparatus can edit video signals with various special effects.

Although the above-described embodiment of the present invention downgrades the resolution of and takes into the hard disk unit only those video signals which are close to editing points, the invention is not limited to this arrangement, but the downgrading of resolution may be dispensed with where the hard disk unit has a sufficient capacity to do without it.

Further, though in the foregoing embodiment a still picture and a time code are to be displayed for video signals not taken into the hard disk unit, the invention is not limited to this disposition, but either a still picture or a time code, instead of both, may be displayed. Or in place of them, where the hard disk unit has a sufficient capacity to permit it, pictures fed on a frame-by-frame basis may be taken into the hard disk unit and displayed in that frame-by-frame form.

Where two scenes are to be linked with a special effect in the above-described embodiment, video signals for the two scenes are to be taken into the hard disk unit and synthesized, but the invention is not limited to this configuration, and instead the video signals for only one scene may be taken into the hard disk unit and those for the other scene may be played back from the playback side VCR. In this case, the result of editing may as well be directly recorded into the recording side VCR.

Whereas special effects by filtering to synthesize two video signals were described with reference to the foregoing embodiment, the present invention is not limited to such special effects, but can also be applied to such other special effects by filtering as fade-out and fade-in for example.

Although the description of the foregoing embodiment referred to a case in which the result of editing by batch processing is to be recorded from magnetic tapes in the ascending order of playback duration, the result of editing by batch processing may as well be recorded in the descending order of playback duration.

In the above-described embodiment, planning of batch processing is to be executed in selectively taking in video signals close to editing points and editing them, but the invention is not limited to this disposition, and may be extensively applied to cases in which video signals on a plurality of magnetic tapes are to be edited and video signals representing the result of editing are to be recorded from these magnetic tapes on to another magnetic tape.

Although the foregoing embodiment supposes an editing procedure using one each of recording side VCR and of playback side VCR, the invention is not limited to this configuration, but a plurality of playback side VCRs may be used for editing.

In the above-described embodiment, video materials recorded on magnetic tapes are to be edited, but the invention is not limited to this disposition, and can be extensively applied to editing of video signals recorded on various media including hard disk units, optical discs and IC cards.

As hitherto described, the invention can provide an editing apparatus of a simple configuration which can execute various aspects of editing by transferring only partial video signals which are needed for the setting of editing points to working memory means and previewing the result of editing with these partial video signals.

What is claimed is:

1. An editing apparatus comprising:
 (a) a playback side memory apparatus configured to output video signals comprising a plurality of video segments, each of said video segments having a duration defined by an in-point and an out-point thereof;
 (b) a recording side memory apparatus for recording selected said video segments from said playback side memory apparatus;
 (c) an editor configured to (i) enable a user to select near-in-points and near-out-points associated with respective said video segments, (ii) store in a memory only limited video date adjacent said selected near-in-points and near-out-points without storing the full said video segments, (iii) enable the user to view said stored video data and select therefrom said in-points and out-points of said video segments, and (iv) create an edit list comprising information corresponding to said in-points and out-points of said video segments; and (d) a playback controller to control transfer of said video segments to said recording side memory apparatus in accordance with said edit list.

2. An editing apparatus as claimed in claim 1, wherein said video data between said near-in-points and near-out-points is stored in said memory in a compressed form.

3. An editing apparatus as claimed in claim 1, wherein said editor further enables the user to process selected portions of said video data between said near-in-points and near-out-points with one or more special effects to add transition video segments between said video segments.

4. An editing apparatus as claimed in claim 1, wherein said editor further enables the user to process selected portions of said video data between said near-in-points and near-out-points with one or more special effects to add transition video segments between said video segments, said selected portions being stored in said memory in an uncompressed form.

5. An editing apparatus as claimed in claim 1, wherein said editor further enables display of a preview window to display said video data stored in said memory and a still picture representing video signals not stored in said memory, composed of video data from said memory.

6. An editing apparatus as claimed in claim 5, wherein said editor further enables display of a preview window to display said video data stored in said memory and a time code of video signals not stored in said memory.

7. An editing apparatus as claimed in claim 1, wherein said editor controls the order of recording of said video segments from a plurality of different recording media so as to minimize the frequency of changing said recording media in said playback side memory apparatus.

8. An editing apparatus as claimed in claim 7, wherein said editor controls the order of recording so that said recording media may be changed in said playback side memory apparatus in either an ascending order or a descending order of playback duration.

9. An editing method comprising:

(a) providing a source of video signals from a playback side memory apparatus, said video signals comprising a plurality of video segments, each of said video segments having a duration defined by an in-point and an out-point thereof;

(b) selecting near-in-points and near-out-points associated with respective said video segments;

(c) storing in a memory only limited video data adjacent said selected near-in-points and near-out-points without storing the full said video segments;

(d) viewing said stored video data and selecting therefrom said in-points and out-points of said video segments;

(e) creating an edit list comprising information corresponding to said in-points and out-points of said video segments; and (f) transferring said video segments to said recording side memory apparatus in accordance with said edit list.

10. An editing method as claimed in claim 9, further comprising storing said video data between said near-in-points and near-out-points in said memory in a compressed form.

11. An editing method as claimed in claim 9, further comprising processing selected portion of said video data between said near-in-points and near-out-points with one or more special effects to add transition video segments between said video segments.

12. An editing method as claimed in claim 9, further comprising processing selected portions of said video data between said near-in-points and near-out-points with one or more special effects to add transition video segments between full video segments, and storing said selected portions in said memory in an uncompressed form.

13. An editing method as claimed in claim 9, further comprising displaying a preview window to display said video data stored in said memory and display a still picture representing video signals not stored in said memory, composed of video data from said memory.

14. An editing method as claimed in claim 13, further comprising displaying a preview window to display said video data stored in said memory and a time code of video signals not stored in said memory.

15. An editing method as claimed in claim 9, further comprising ordering the recording of said video segments from a plurality of recording media so as to minimize the frequency of changing said recording media in said playback side memory apparatus.

16. An editing method as claimed in claim 15, further comprising ordering the recording so that said recording media may be changed in said playback side memory apparatus in either an ascending order or a descending order of playback duration.

17. An editing apparatus comprising:

(a) a playback side memory apparatus configured to output video signals comprising a plurality of video segments, each of said video segments having a duration defined by an in-point and an out-point thereof;

(b) a recording side memory apparatus for recording selected said video segments from said playback side memory apparatus; and (c) a computer comprising a playback controller to control operation of said playback side memory apparatus, a memory, and a processor running an editor program configured to (i) enable a user to select near-in-points and near-out-points associated with respective said video segments, (ii) store in said memory only limited video data adjacent said selected near-in-points and near-out-points without storing the full said video segments, (iii) enable the user to view said stored video data and select therefrom said in-points and out-points of said video segments, (iv) create an edit list comprising information corresponding to said in-points and out-points of said video segments, and (v) control said playback controller to control transfer of said video segments to said recording side memory apparatus in accordance with said edit list.

* * * * *